United States Patent
Kelliher et al.

(10) Patent No.: US 9,695,382 B2
(45) Date of Patent: **\*Jul. 4, 2017**

(54) SMB PROCESS FOR PRODUCING HIGHLY PURE EPA FROM FISH OIL

(71) Applicant: BASF PHARMA (CALLANISH) LIMITED, Cheshire (GB)

(72) Inventors: Adam Kelliher, Cheshire (GB); Angus Morrison, Cheshire (GB); Anil Oroskar, Lombard, IL (US); Rakesh Vikraman Nair Rema, Lombard, IL (US); Abhilesh Agarwal, Lombard, IL (US)

(73) Assignee: BASF PHARMA (CALLANISH) LIMITED, Cheshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/066,120

(22) Filed: Mar. 10, 2016

(65) Prior Publication Data

US 2016/0186092 A1 Jun. 30, 2016

Related U.S. Application Data

(63) Continuation of application No. 13/880,146, filed as application No. PCT/GB2012/051593 on Jul. 6, 2012, now Pat. No. 9,315,762.

(30) Foreign Application Priority Data

Jul. 6, 2011 (GB) .................................... 1111595.3

(51) Int. Cl.
   *C11B 7/00* (2006.01)
   *C11B 3/10* (2006.01)
   (Continued)

(52) U.S. Cl.
   CPC ................ *C11B 3/10* (2013.01); *B01D 15/02* (2013.01); *B01D 15/10* (2013.01); *B01D 15/426* (2013.01);
   (Continued)

(58) Field of Classification Search
   CPC ..... C11B 7/00; C11B 3/13; C11B 3/00; C11C 1/00; C11C 1/08
   (Continued)

(56) References Cited

U.S. PATENT DOCUMENTS

| 2,985,589 A | 5/1961 | Broughton et al. |
| 3,696,107 A | 10/1972 | Neuzil |

(Continued)

FOREIGN PATENT DOCUMENTS

| DK | 1338316 | 3/2005 |
| DK | 1128881 | 10/2005 |

(Continued)

OTHER PUBLICATIONS

PCT International Search Report and Written Opinion in PCT/GB2012/051591, mailed Sep. 27, 2012, 16 pages.

(Continued)

*Primary Examiner* — Deborah D Carr
(74) *Attorney, Agent, or Firm* — Knobbe, Martens, Olson & Bear, LLP

(57) ABSTRACT

The present invention provides a chromatographic separation process for recovering a polyunsaturated fatty acid (PUFA) product from a feed mixture which is a fish oil or which is derived from fish oil, which process comprises the steps of:

(i) purifying the feed mixture in a chromatographic separation step, to obtain a first intermediate product; and
(ii) purifying the first intermediate product obtained in (i) in a simulated or actual moving bed chromatographic separation step, to obtain a second intermediate product; and (Continued)

(iii) purifying the second intermediate product obtained in (ii) in a simulated or actual moving bed chromatographic separation step, to obtain the PUFA product; wherein an aqueous organic solvent is used as eluent in each separation step;

saturated and/or monounsaturated fatty acids present in the feed mixture are removed in the first separation step;

the PUFA product is separated from different components of the feed mixture in steps (ii) and (iii); and the PUFA product obtained in the third separation step contains EPA or an EPA derivative in an amount greater than 90 wt %.

16 Claims, 10 Drawing Sheets

(51) Int. Cl.
    *B01D 15/02*    (2006.01)
    *B01D 15/42*    (2006.01)
    *B01D 15/10*    (2006.01)
    *C11C 1/00*    (2006.01)
    *C11C 1/08*    (2006.01)
    *C11C 3/00*    (2006.01)

(52) U.S. Cl.
    CPC ............... *C11C 1/005* (2013.01); *C11C 1/08* (2013.01); *C11C 3/003* (2013.01)

(58) Field of Classification Search
    USPC .................................................. 554/191, 205
    See application file for complete search history.

(56) References Cited

U.S. PATENT DOCUMENTS

| | | | |
|---|---|---|---|
| 3,706,812 A | 12/1972 | Derosset et al. | |
| 3,761,533 A | 9/1973 | Otani et al. | |
| 4,036,745 A | 7/1977 | Broughton | |
| 4,048,111 A | 9/1977 | Rosback et al. | |
| 4,048,205 A | 9/1977 | Neuzil et al. | |
| 4,049,688 A | 9/1977 | Neuzil et al. | |
| 4,313,015 A | 1/1982 | Broughton | |
| 4,329,280 A | 5/1982 | Cleary et al. | |
| 4,353,838 A | 10/1982 | Cleary et al. | |
| 4,353,839 A | 10/1982 | Cleary et al. | |
| 4,404,145 A | 9/1983 | Cleary et al. | |
| 4,433,195 A | 2/1984 | Kulprathipanja | |
| 4,486,618 A | 12/1984 | Kulprathipanja et al. | |
| 4,495,106 A | 1/1985 | Cleary et al. | |
| 4,511,514 A | 4/1985 | Cleary et al. | |
| 4,519,952 A | 5/1985 | Cleary et al. | |
| 4,521,343 A | 6/1985 | Chao et al. | |
| 4,522,761 A | 6/1985 | Cleary et al. | |
| 4,524,029 A | 6/1985 | Cleary et al. | |
| 4,524,030 A | 6/1985 | Cleary et al. | |
| 4,524,049 A | 6/1985 | Sit | |
| 4,529,551 A | 7/1985 | Cleary et al. | |
| 4,560,675 A | 12/1985 | Cleary et al. | |
| 4,605,783 A | 8/1986 | Zinnen | |
| 4,720,579 A | 1/1988 | Kulprathipanja | |
| 4,764,276 A | 8/1988 | Berry et al. | |
| 4,882,065 A | 11/1989 | Barder | |
| 4,902,829 A | 2/1990 | Kulprtahipanja | |
| 4,961,881 A | 10/1990 | Ou | |
| 5,068,418 A | 11/1991 | Kulprathipanja et al. | |
| 5,068,419 A | 11/1991 | Kulprathipanja et al. | |
| 5,069,883 A | 12/1991 | Matonte | |
| 5,093,004 A | 3/1992 | Hotier | |
| 5,114,590 A | 5/1992 | Hotier et al. | |
| 5,179,219 A | 1/1993 | Priegnitz | |
| 5,225,580 A | 7/1993 | Zinnen | |
| 5,405,534 A | 4/1995 | Ishida et al. | |
| 5,422,007 A | 6/1995 | Nicoud et al. | |
| 5,502,077 A | 3/1996 | Breivik et al. | |
| 5,547,580 A | 8/1996 | Tsujii et al. | |
| 5,656,667 A | 8/1997 | Breivik et al. | |
| 5,698,594 A | 12/1997 | Breivik et al. | |
| 5,719,302 A * | 2/1998 | Perrut et al. | ................... 554/191 |
| 5,777,141 A | 7/1998 | Brunner et al. | |
| 5,840,181 A | 11/1998 | Patton et al. | |
| 5,917,068 A | 6/1999 | Barnicki et al. | |
| 5,945,318 A | 8/1999 | Breivik et al. | |
| 6,013,186 A | 1/2000 | Patton et al. | |
| 6,063,284 A | 5/2000 | Grill | |
| 6,096,218 A | 8/2000 | Hauck | |
| 6,136,198 A | 10/2000 | Adam et al. | |
| 6,204,401 B1 | 3/2001 | Perrut et al. | |
| 6,313,330 B1 | 11/2001 | Kiyohara et al. | |
| 6,325,898 B1 | 12/2001 | Blehaut et al. | |
| 6,350,890 B1 | 2/2002 | Kiy et al. | |
| 6,409,923 B1 | 6/2002 | Nicoud et al. | |
| 6,413,419 B1 | 7/2002 | Adam et al. | |
| 6,471,870 B1 | 10/2002 | Nicoud | |
| 6,518,049 B1 | 2/2003 | Haraldsson et al. | |
| 6,544,413 B1 | 4/2003 | Nagamatsu et al. | |
| 6,713,447 B2 | 3/2004 | Beaudoin et al. | |
| 6,789,502 B2 | 9/2004 | Hjaltason et al. | |
| 6,863,824 B2 | 3/2005 | Hamende et al. | |
| 6,979,402 B1 | 12/2005 | Sprague et al. | |
| 7,063,855 B2 | 6/2006 | Hjaltason et al. | |
| 7,462,643 B1 | 12/2008 | Pamparana | |
| 7,491,522 B2 | 2/2009 | Haraldsson et al. | |
| 7,541,480 B2 | 6/2009 | Bruzzese | |
| 7,588,791 B2 | 9/2009 | Fabritius | |
| 7,667,061 B2 | 2/2010 | Binder et al. | |
| 7,678,930 B2 | 3/2010 | Sondbo et al. | |
| 7,705,170 B2 | 4/2010 | Geier et al. | |
| 7,709,236 B2 | 5/2010 | Akimoto et al. | |
| 7,718,698 B2 | 5/2010 | Breivik et al. | |
| 7,732,488 B2 | 6/2010 | Breivik et al. | |
| 7,807,848 B2 | 10/2010 | Wang | |
| 8,063,235 B2 | 11/2011 | Krumbholz et al. | |
| 8,216,475 B2 | 7/2012 | Valery et al. | |
| 8,282,831 B2 | 10/2012 | Kessler et al. | |
| 2002/0011445 A1 | 1/2002 | Lehoucq et al. | |
| 2002/0068833 A1 | 6/2002 | Chanteloup et al. | |
| 2003/0006191 A1 | 1/2003 | Heikkila et al. | |
| 2003/0216543 A1 | 11/2003 | Wang et al. | |
| 2003/0222024 A1 | 12/2003 | Hamende et al. | |
| 2004/0099604 A1 | 5/2004 | Hauck | |
| 2004/0174769 A1 | 9/2004 | Weetman | |
| 2005/0087494 A1 | 4/2005 | Hauck et al. | |
| 2006/0008667 A1 | 1/2006 | Kim et al. | |
| 2006/0124549 A1 | 6/2006 | Bailly et al. | |
| 2007/0068873 A1 | 3/2007 | Oroskar et al. | |
| 2007/0148315 A1 | 6/2007 | Schaap et al. | |
| 2007/0158270 A1 | 7/2007 | Geier et al. | |
| 2007/0181504 A1 | 8/2007 | Binder et al. | |
| 2008/0234375 A1 | 9/2008 | Breivik et al. | |
| 2009/0023808 A1 | 1/2009 | Raman et al. | |
| 2009/0176284 A1 | 7/2009 | Furihata et al. | |
| 2010/0012584 A1 | 1/2010 | Majewski et al. | |
| 2010/0069492 A1 | 3/2010 | Geiringer et al. | |
| 2010/0104657 A1 | 4/2010 | Sondbo et al. | |
| 2010/0160435 A1 | 6/2010 | Bruzzese | |
| 2010/0163490 A1 | 7/2010 | Lasalle | |
| 2010/0176058 A1 | 7/2010 | Bryntesson et al. | |
| 2010/0186587 A1 | 7/2010 | Kessler et al. | |
| 2010/0190220 A1 | 7/2010 | Furihata et al. | |
| 2010/0197785 A1 | 8/2010 | Breivik et al. | |
| 2010/0233281 A1 | 9/2010 | Breivik et al. | |
| 2010/0267829 A1 | 10/2010 | Breivik et al. | |
| 2010/0278879 A1 | 11/2010 | Manku | |
| 2010/0331559 A1 | 12/2010 | Feist et al. | |
| 2010/0331561 A1 | 12/2010 | Schaap et al. | |
| 2011/0000853 A1 | 1/2011 | Valery et al. | |
| 2011/0015418 A1 | 1/2011 | Krumbholz et al. | |
| 2011/0030457 A1 | 2/2011 | Valery et al. | |
| 2011/0091947 A1 | 4/2011 | Kim et al. | |
| 2011/0139001 A1 | 6/2011 | Hiliareau et al. | |
| 2011/0168632 A1 | 7/2011 | Valery et al. | |

(56) References Cited

U.S. PATENT DOCUMENTS

| | | |
|---|---|---|
| 2012/0214966 A1 | 8/2012 | Theoleyre et al. |
| 2012/0225120 A1 | 9/2012 | Manku |
| 2012/0232141 A1 | 9/2012 | Hustvedt et al. |

FOREIGN PATENT DOCUMENTS

| | | |
|---|---|---|
| EP | 0255824 | 7/1987 |
| EP | 0697034 | 11/1994 |
| EP | 0981399 | 11/1998 |
| EP | 1152755 | 8/2000 |
| EP | 1 065 196 | 1/2001 |
| EP | 1106602 | 6/2001 |
| EP | 1250058 | 7/2001 |
| EP | 1250059 | 7/2001 |
| EP | 1157692 | 11/2001 |
| EP | 1392411 | 11/2002 |
| EP | 1436370 | 4/2003 |
| EP | 1523541 | 1/2004 |
| EP | 1534807 | 1/2004 |
| EP | 1685222 | 6/2005 |
| EP | 1749079 | 10/2005 |
| EP | 1982752 | 10/2008 |
| EP | 2173184 | 1/2009 |
| EP | 2173699 | 1/2009 |
| EP | 2169038 | 3/2010 |
| EP | 2295529 | 7/2012 |
| FR | 2103302 | 7/1971 |
| FR | 2651148 | 3/1991 |
| FR | 2651149 | 3/1991 |
| FR | 2897238 | 8/2007 |
| GB | 2221843 | 2/1990 |
| HK | 1078509 | 6/2006 |
| JP | 58-088339 | 5/1983 |
| JP | 58-109444 | 6/1983 |
| JP | S58109444 A | 6/1983 |
| JP | 60-208940 | 10/1985 |
| JP | 61-192797 | 8/1986 |
| JP | S63-88159 | 4/1988 |
| JP | 01197596 A | 8/1989 |
| JP | H01-197596 | 8/1989 |
| JP | 1992-235701 | 8/1992 |
| JP | 1992235701 | 8/1992 |
| JP | H04-235701 | 8/1992 |
| JP | 62-87594 | 10/1994 |
| JP | 6287594 A | 10/1994 |
| JP | 09-157684 | 6/1997 |
| JP | H09-151390 | 6/1997 |
| JP | H10-310555 | 11/1998 |
| JP | H10310556 A | 11/1998 |
| JP | 11-057302 | 3/1999 |
| JP | 2872986 B1 | 3/1999 |
| JP | 11-090105 | 4/1999 |
| JP | 2001-72993 | 3/2001 |
| JP | 2001-139981 | 5/2001 |
| JP | 2003-530572 | 10/2003 |
| JP | 2006-133160 | 5/2006 |
| JP | 3905538 | 1/2007 |
| JP | 2008-061571 | 3/2008 |
| JP | 2009-529890 | 8/2009 |
| JP | 2009-529891 | 8/2009 |
| JP | 2000-280663 | 10/2010 |
| SI | 1797021 | 4/2009 |
| WO | WO 87/03899 | 7/1987 |
| WO | WO 94/25552 | 11/1994 |
| WO | WO 98/32514 | 7/1998 |
| WO | WO 99/47228 | 9/1999 |
| WO | WO 00/25885 | 5/2000 |
| WO | WO 01/77662 | 10/2001 |
| WO | WO 01/87451 | 11/2001 |
| WO | WO 01/87452 | 11/2001 |
| WO | WO 01/87924 | 11/2001 |
| WO | WO 2004/007654 | 1/2004 |
| WO | WO 2005/100519 | 10/2005 |
| WO | WO 2007/012750 | 2/2007 |
| WO | WO 2007/017240 | 2/2007 |
| WO | WO 2007/038417 | 4/2007 |
| WO | WO 2007/075499 | 7/2007 |
| WO | WO 2007075499 A2 * | 7/2007 |
| WO | WO 2007/093690 | 8/2007 |
| WO | WO 2007/147554 | 12/2007 |
| WO | WO 2008/004900 | 1/2008 |
| WO | WO 2008/107562 | 9/2008 |
| WO | WO 2008/149177 | 12/2008 |
| WO | WO 2009/047408 | 4/2009 |
| WO | WO 2009/105351 | 8/2009 |
| WO | WO 2010/018423 | 2/2010 |
| WO | WO 2010/119319 | 10/2010 |
| WO | WO 2011/048169 | 4/2011 |
| WO | WO 2011/080503 | 7/2011 |
| WO | WO 2013/005046 | 1/2013 |
| WO | WO 2013/005047 | 1/2013 |
| WO | WO 2013/005048 | 1/2013 |
| WO | WO 2013/005051 | 1/2013 |
| WO | WO 2013/005052 | 1/2013 |
| ZA | 8905758 | 4/1990 |

OTHER PUBLICATIONS

PCT International Search Report and Written Opinion in PCT/GB2012/051592, mailed Sep. 27, 2012, 12 pages.
PCT International Search Report and Written Opinion in PCT/GB2012/051593, mailed Sep. 27, 2012, 13 pages.
PCT International Search Report and Written Opinion in PCT/GB2012/051596, mailed Sep. 27, 2012, 15 pages.
PCT International Search Report and Written Opinion in PCT/GB2012/051597, mailed Sep. 27, 2012, 15 pages.
PCT International Search Report in PCT/GB2010/002339, mailed Jul. 7, 2011, 7 pages.
PCT International Search Report in PCT/GB2014/050054, mailed May 23, 2014, 5 pages.
PCT International Written Opinion in PCT/GB2010/002339, mailed Jun. 30, 2012, 10 pages.
PCT International Written Opinion in PCT/GB2014/050054, mailed Jul. 9, 2015, 6 pages.
Non-Final Office Action in U.S. Appl. No. 13/880,146, dated Jul. 9, 2015, 6 pages.
Non-Final Office Action in U.S. Appl. No. 13/880,150, dated Oct. 9, 2015, 20 pages.
Non-Final Office Action in U.S. Appl. No. 13/880,145, dated Jun. 24, 2015, 15 pages.
Non-Final Office Action in U.S. Appl. No. 13/519,618, dated Jan. 23, 2015, 5 pages.
Non-Final Office Action in U.S. Appl. No. 13/880,154, dated Apr. 1, 2015, 17 pages.
Non-Final Office Action in U.S. Appl. No. 13/880,148, dated Feb. 20, 2015, 15 pages.
Non-Final Office Action in U.S. Appl. No. 14/759,764, dated Dec. 31, 2015, 21 pages.
Non-Final Office Action in U.S. Appl. No. 14/870,873, dated Jan. 20, 2016, 14 pages.
Santos, M.A.G., et al., Simulated Moving-Bed Adsorption for Separation of Racemic Mixtures, *Brazilian Journal of Chemical Engineering*, vol. 21, No. 1 2004, 127-136.
Guiochon, Georges, et al., Fundamentals of Preparative and Nonlinear Chromatography, Elsevier 2006, 833-835.
Heinisch, Sabine, et al., Sense and nonsense of high-temperature liquid chromatography, Journal of Chromatography A 1216 2009, 642-658.
Szepesy, et al., Journal of Chromatography, vol. 108, No. 2 1975, 285-297.
Quan, Wenqin, et al., Determination of eicosapentaenoic acid and docosahexaenoic acid in fish oil by high performance liquid chromatography/mass spectrometry, *Food & Machinery*, vol. 24 No. 2, pp. 114-117 Mar. 31, 2008, 4 pages.
Quan, Wenqin, et al., Study on the enrichment of glyceride of w-3PUFA, *Chinese Master's Theses Full-text Database Basic Sciences*, A0062-42 Mar. 15, 2009, 77 pages.
Xie, et al., Biotechnology Progress, *American Institute of Chemical Engineers* vol. 18, No. 6 2002, 1332-1344.

(56) References Cited

OTHER PUBLICATIONS

Z Tao, et al., Study on extracting high contents of DHA and EPA by using silver nitrate-water method. Chinese Journal of Marine Drugs, (2004) 99:28-30.

Communication pursuant to Rule 114(2) EPC dated Dec. 1, 2016 in European Patent Application No. 12735933.9, Patent No. EP 2613859.

Snyder et al., "Preparative Separations"—Introduction to Modern Liquid Chromatography, Chapter 15, Third Edition, 2010, Wiley & Sons, Inc.

Snyder et al., "Basic Concepts and the Control of Separation"—Introduction to Modern Liquid Chromatography, Chapter 2, Third Edition, 2010, Wiley & Sons, Inc.

Third party submission of information submitted on Jan. 31, 2017 in Japanese Application No. 2014-517954.

Quan, Wenqin , "Study on the enrichment of glyceride of .omega.-3PUFA", Chinese Master's Theses Full-text Database Basic Sciences, A0062-42 Mar. 15, 2009.

Operation and Utilizing manner of a Liquid Chromatography Device (Mar. 11, 2008, retrieved at URL: http://www.wakayama-edc.big-u.jp/kankyo/ekikuro/ekikuro.pdf).

Third Party Submission of Information submitted on Mar. 3, 2017 in Japanese Application No. 2015-10829.

Reference Table 1 Chlorinated dioxins in health food using fish oil toxicity equivalent and intake, retrieved at http://www.mhlw.go.jp/topics/bukyoku/iyaku/syoku-anzen/dioxin/sessyu05/dl/03-03i.pdf (Jul. 30, 2008).

Survey results on the survey of daily intake of dioxins from food in FY 2007, retrieved at http://www.mhlw.go.jp/topics/bukyoku/iyaku/syoku-anzen/dioxin/sessyu07/index.html (Jul. 30, 2008).

Survey results on the survey of daily intake of dioxins from foods in FY 2008, retrieved at http://www.mhlw.go.jp/topics/bukyoku/iyaku/syoku-anzen/dioxin/sessyu08/index.html (Sep. 30, 2009).

Survey results on the survey on daily intake of dioxins from foods in FY 2009, retrieved at http://www.mhlw.go.jp/topics/bukyoku/iyaku/syoku-anzen/dioxin/sessyu09/index.html (Oct. 8, 2010).

\* cited by examiner

Figure 3
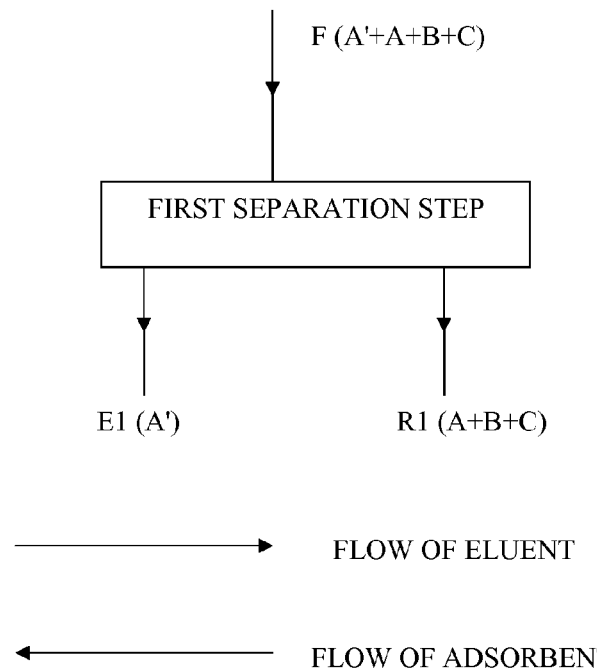
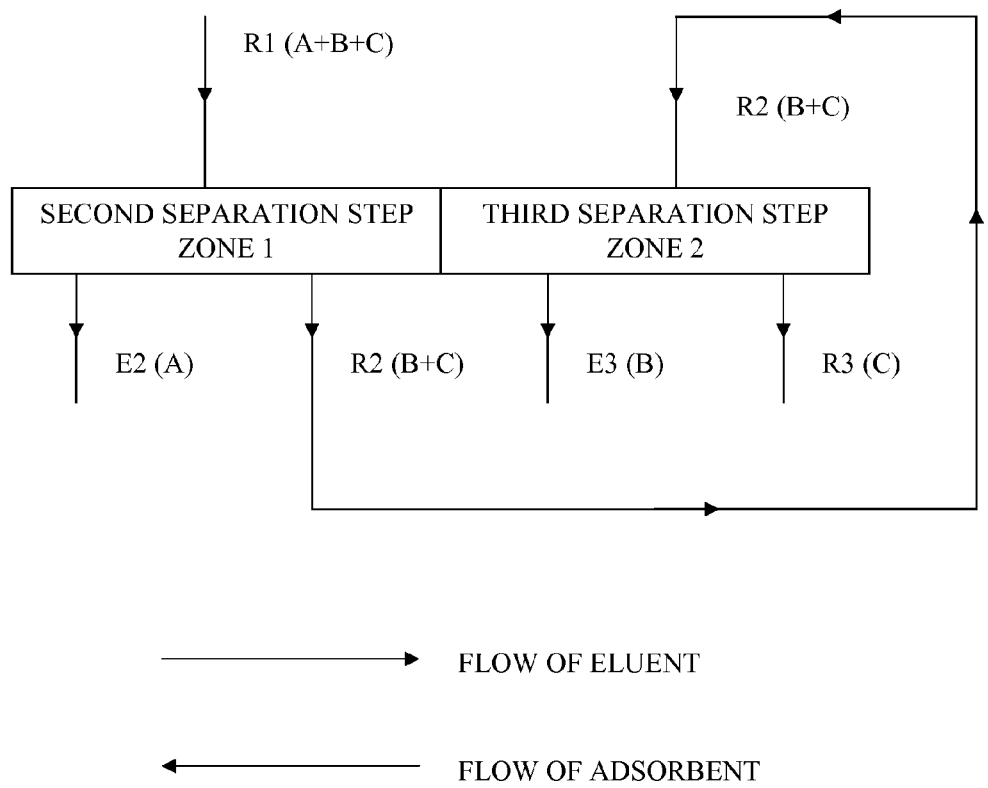

Figure 4
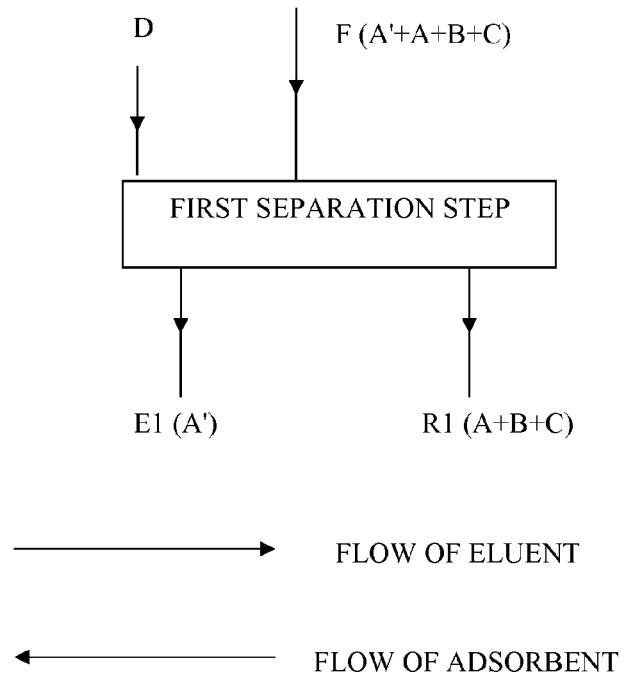
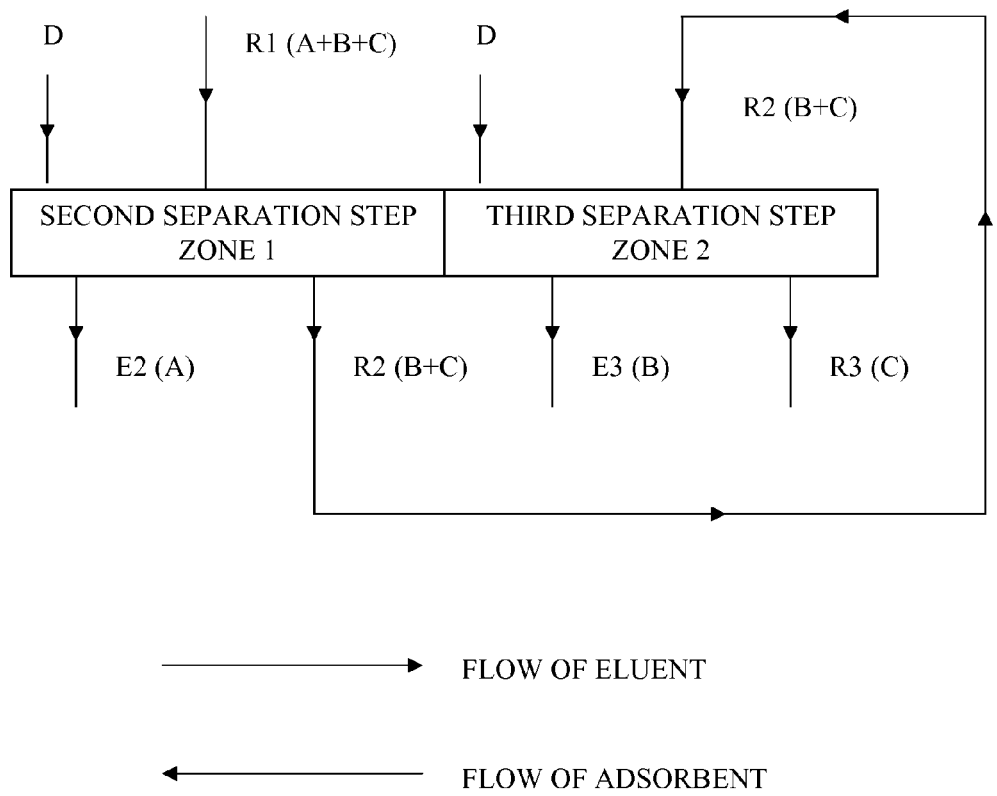

EPA 55 Feed material

EPA 85 EE intermediate from first separation step

EPA 93 EE intermediate from second separation step

EPA 97 EE final PUFA product

SMB PROCESS FOR PRODUCING HIGHLY PURE EPA FROM FISH OIL

CROSS-REFERENCE TO RELATED APPLICATIONS

This application is a continuation of co-pending U.S. application Ser. No. 13/880,146, filed Jul. 22, 2013, which is the National Phase entry of International Application No. PCT/GB2012/051593, filed Jul. 6, 2012, which claims priority to Great Britain Application No. 1111595.3, filed Jul. 6, 2011, the disclosures of which are incorporated herein in their entireties.

BACKGROUND OF THE INVENTION

The present invention relates to an improved chromatographic separation process for purifying the polyunsaturated fatty acid EPA or a derivative thereof.

EPA and its derivatives are precursors for biologically important molecules, which play an important role in the regulation of biological functions such as platelet aggregation, inflammation and immunological responses. Thus, EPA and its derivatives may be therapeutically useful in treating a wide range of pathological conditions including CNS conditions; neuropathies, including diabetic neuropathy; cardiovascular diseases; general immune system and inflammatory conditions, including inflammatory skin diseases.

EPA is found in natural raw materials, and in particular fish oils. The EPA in fish oils is, however, present in such oils in admixture with saturated fatty acids and numerous other impurities.

Purification of EPA from fish oils is particularly challenging. Thus, fish oils are extremely complex mixtures containing a large number of different components with very similar retention times in chromatography apparatuses. They represent a much more challenging feedstock from which to purify EPA than, for example, an algal oil feedstock. However, a very high degree of purity of EPA is required, particularly for pharmaceutical and nutraceutical applications. Historically, therefore, distillation has been used to purify EPA for therapeutic applications.

Unfortunately, EPA is extremely fragile. Thus, when heated in the presence of oxygen, it is prone to isomerization, peroxidation and oligomerization. The fractionation and purification of EPA to prepare pure fatty acids is therefore difficult. Distillation, even under vacuum, can lead to non-acceptable product degradation.

Simulated and actual moving bed chromatography are known techniques, familiar to those of skill in the art. The principle of operation involves countercurrent movement of a liquid eluent phase and a solid adsorbent phase. This operation allows minimal usage of solvent making the process economically viable. Such separation technology has found several applications in diverse areas, including hydrocarbons, industrial chemicals, oils, sugars and APIs.

As is well known, in a conventional stationary bed chromatographic system, a mixture whose components are to be separated percolates through a container. The container is generally cylindrical, and is typically referred to as the column. The column contains a packing of a porous material (generally called the stationary phase) exhibiting a high permeability to fluids. The percolation velocity of each component of the mixture depends on the physical properties of that component so that the components exit from the column successively and selectively. Thus, some of the components tend to fix strongly to the stationary phase and thus will percolate slowly, whereas others tend to fix weakly and exit from the column more quickly. Many different stationary bed chromatographic systems have been proposed and are used for both analytical and industrial production purposes.

In contrast, a simulated moving bed chromatography apparatus consists of a number of individual columns containing adsorbent which are connected together in series. Eluent is passed through the columns in a first direction. The injection points of the feedstock and the eluent, and the separated component collection points in the system, are periodically shifted by means of a series of valves. The overall effect is to simulate the operation of a single column containing a moving bed of the solid adsorbent, the solid adsorbent moving in a countercurrent direction to the flow of eluent. Thus, a simulated moving bed system consists of columns which, as in a conventional stationary bed system, contain stationary beds of solid adsorbent through which eluent is passed, but in a simulated moving bed system the operation is such as to simulate a continuous countercurrent moving bed.

Processes and equipment for simulated moving bed chromatography are described in several patents, including U.S. Pat. No. 2,985,589, U.S. Pat. No. 3,696,107, U.S. Pat. No. 3,706,812, U.S. Pat. No. 3,761,533, FR-A-2103302, FR-A-2651148 and FR-A-2651149, the entirety of which are incorporated herein by reference. The topic is also dealt with at length in "Preparative and Production Scale Chromatography", edited by Ganetsos and Barker, Marcel Dekker Inc, New York, 1993, the entirety of which is incorporated herein by reference.

An actual moving bed system is similar in operation to a simulated moving bed system. However, rather than shifting the injection points of the feed mixture and the eluent, and the separated component collection points by means of a system of valves, instead a series of adsorption units (i.e. columns) are physically moved relative to the feed and drawoff points. Again, operation is such as to simulate a continuous countercurrent moving bed.

Processes and equipment for actual moving bed chromatography are described in several patents, including U.S. Pat. No. 6,979,402, U.S. Pat. No. 5,069,883 and U.S. Pat. No. 4,764,276, the entirety of which are incorporated herein by reference.

A typical simulated moving bed chromatography apparatus is illustrated with reference to FIG. 1. The concept of a simulated or actual moving bed chromatographic separation process is explained by considering a vertical chromatographic column containing stationary phase S divided into sections, more precisely into four superimposed sub-zones I, II, III and IV going from the bottom to the top of the column. The eluent is introduced at the bottom at IE by means of a pump P. The mixture of the components A and B which are to be separated is introduced at IA+B between sub-zone II and sub-zone III. An extract containing mainly B is collected at SB between sub-zone I and sub-zone II, and a raffinate containing mainly A is collected at SA between sub-zone III and sub-zone IV.

In the case of a simulated moving bed system, a simulated downward movement of the stationary phase S is caused by movement of the introduction and collection points relative to the solid phase. In the case of an actual moving bed system, simulated downward movement of the stationary phase S is caused by movement of the various chromatographic columns relative to the introduction and collection points. In FIG. 1, eluent flows upward and mixture A+B is injected between sub-zone II and sub-zone III. The components will move according to their chromatographic interactions with the stationary phase, for example adsorption on a porous medium. The component B that exhibits stronger affinity to the stationary phase (the slower running component) will be more slowly entrained by the eluent and will follow it with delay. The component A that exhibits the weaker affinity to the stationary phase (the faster running component) will be easily entrained by the eluent. If the right set of parameters, especially the flow rate in each sub-zone, are correctly estimated and controlled, the component A exhibiting the weaker affinity to the stationary phase will be collected between sub-zone III and sub-zone IV as a raffinate and the component B exhibiting the stronger affinity to the stationary phase will be collected between sub-zone I and sub-zone II as an extract.

To achieve high purity EPA or EPA ethyl ester in purities of greater than 90%, for example greater than 95 or 97%, it is possible to utilise a simulated moving bed separation process which performs two simultaneous separation steps. Such a process is described in international patent application no. PCT/GB10/002339, the entirety of which is incorporated herein by reference.

In general, all chromatographic separation techniques for separating PUFAs, including SMB processes, utilise large volumes of organic solvents as eluents. After the chromatographic separation process is completed the PUFAs must be recovered from solution in the eluent. Typically a large expenditure of time and energy is involved in recovering PUFAs from solution in the eluent. Furthermore, organic solvents used as eluents in chromatographic separation processes are frequently harmful to the environment or to the operatives handling them. Therefore, a chromatographic separation process which reduces the amount of organic solvent that needs to be used is required.

It has now been advantageously found that EPA or an EPA derivative can be produced in a similarly high purity as described in PCT/GB10/002339 by a three-step separation process which uses a much lower volume of solvent that the two-step process. The improved process of the present invention utilises almost 50% less solvent than the two-step process described in PCT/GB10/002339. This is clearly advantageous in terms of cost, ease of recovery of product, and environmental impact.

SUMMARY OF THE INVENTION

It has been surprisingly found that EPA or an EPA derivative can be effectively purified from commercially available feedstocks such as fish oils by simulated or actual moving bed apparatus using a relatively low volume of an aqueous organic solvent eluent. The present invention therefore provides a chromatographic separation process for recovering a polyunsaturated fatty acid (PUFA) product from a feed mixture which is a fish oil or which is derived from fish oil, which process comprises the steps of:
(i) purifying the feed mixture in a chromatographic separation step, to obtain a first intermediate product; and
(ii) purifying the first intermediate product obtained in (i) in a simulated or actual moving bed chromatographic separation step, to obtain a second intermediate product; and
(iii) purifying the second intermediate product obtained in (ii) in a simulated or actual moving bed chromatographic separation step, to obtain the PUFA product; wherein an aqueous organic solvent is used as eluent in each separation step;
saturated and/or monounsaturated fatty acids present in the feed mixture are removed in the first separation step;
the PUFA product is separated from different components of the feed mixture in steps (ii) and (iii); and
the PUFA product obtained in the third separation step contains EPA or an EPA derivative in an amount greater than 90 wt %.

Also provided is a PUFA product obtainable by the process of the present invention.

DESCRIPTION OF THE FIGURES

FIG. 3 illustrates a preferred embodiment of the invention which is suitable for producing high purity EPA.

FIG. 4 illustrates in more detail the embodiment of FIG. 2.

DETAILED DESCRIPTION OF THE INVENTION

Figure 1:
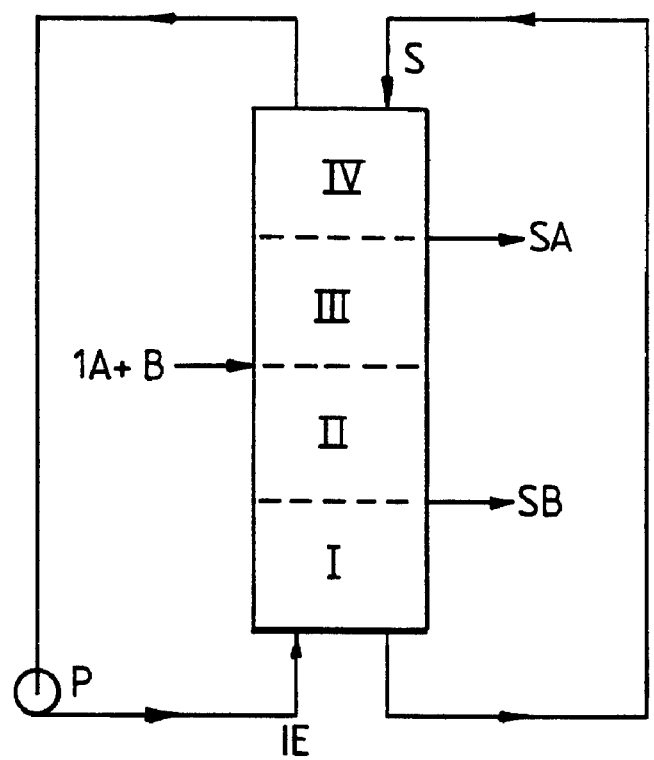
FIG. 1 illustrates the basic principles of a simulated or actual moving bed process for separating a binary mixture.

As used herein, the term "PUFA product" refers to a product comprising one or more polyunsaturated fatty acids (PUFAs), and/or derivatives thereof, typically of nutritional or pharmaceutical significance. The PUFA product obtained in the process of the present invention contains EPA or an EPA derivative in an amount greater than 90 wt %, i.e. EPA or an EPA derivative is present at 90 wt % purity relative to all of the components in the final PUFA product not including the aqueous organic solvent eluent. Thus EPA or an EPA derivative is present in the PUFA product in an amount of at least 90 wt % on the basis of all of the components of the PUFA product which originated in the feed mixture.

An EPA derivative is EPA in the form of a mono-, di- or tri-glyceride, ester, phospholipid, amide, lactone, or salt. Triglycerides and esters are preferred. Esters are more preferred. Esters are typically alkyl esters, preferably $C_1$-$C_6$ alkyl esters, more preferably $C_1$-$C_4$ alkyl esters. Examples of esters include methyl and ethyl esters. Ethyl esters are most preferred.

Typically, the PUFA product contains EPA or an EPA derivative in an amount greater than 95 wt %, preferably greater than 97 wt %.

In one embodiment, the PUFA product contains EPA in an amount greater than 90 wt %, preferably greater than 95 wt %, more preferably greater than 97 wt %. As explained above, EPA is present at the specified wt % relative to the total amount of all of the components of the PUFA product which originated in the feed mixture.

In another embodiment, the PUFA product contains EPA ethyl ester in an amount greater than 90 wt %, preferably greater than 95 wt %, more preferably greater than 97 wt %. As explained above, EPA is present at the specified wt % relative to the total amount of all of the components of the PUFA product which originated in the feed mixture.

Suitable feed mixtures for fractionating by the process of the present invention are fish oils, or feed stocks derived from fish oils. Suitable fish oils for use in the process of the present invention are well known to the skilled person. Typical fish oils contain EPA, DHA, SDA, and typically a range of other PUFAs both more and less polar than EPA, saturated fatty acids and monounsaturated fatty acids.

The feed mixture may undergo chemical treatment before fractionation by the process of the invention. For example, it may undergo glyceride transesterification or glyceride hydrolysis followed in certain cases by selective processes such as crystallisation, molecular distillation, urea fractionation, extraction with silver nitrate or other metal salt solutions, iodolactonisation or supercritical fluid fractionation. Alternatively, a feed mixture may be used directly with no initial treatment step.

The feed mixtures typically contain the PUFA product and at least one more polar component and at least one less polar component. The less polar components have a stronger adherence to the adsorbent used in the process of the present invention than does the PUFA product. During operation, such less polar components typically move with the solid adsorbent phase in preference to the liquid eluent phase. The more polar components have a weaker adherence to the adsorbent used in the process of the present invention than does the PUFA product. During operation, such more polar components typically move with the liquid eluent phase in preference to the solid adsorbent phase. In general, more polar components will be separated into a raffinate stream, and less polar components will be separated into an extract stream.

Examples of the more and less polar components include (1) other compounds occurring in natural oils (e.g. marine oils), (2) byproducts formed during storage, refining and previous concentration steps and (3) contaminants from solvents or reagents which are utilized during previous concentration or purification steps.

Examples of (1) include other unwanted PUFAs; saturated fatty acids; sterols, for example cholesterol; vitamins; and environmental pollutants, such as polychlorobiphenyl (PCB), polyaromatic hydrocarbon (PAH) pesticides, chlorinated pesticides, dioxines and heavy metals. PCB, PAH, dioxines and chlorinated pesticides are all highly non-polar components.

Examples of (2) include isomers and oxidation or decomposition products from the PUFA product, for instance, auto-oxidation polymeric products of fatty acids or their derivatives.

Examples of (3) include urea which may be added to remove saturated or monounsaturated fatty acids from the feed mixture.

Preferably, the feed mixture is a PUFA-containing marine oil (e.g. a fish oil), more preferably a marine oil (e.g. a fish oil) comprising EPA and/or DHA.

A typical feed mixture for preparing concentrated EPA (EE) by the process of the present invention comprises 50-75% EPA (EE), 0 to 10% DHA (EE), and other components including other essential ω-3 and ω-6 fatty acids.

A preferred feed mixture for preparing concentrated EPA (EE) by the process of the present invention comprises 55% EPA (EE), 5% DHA (EE), and other components including other essential ω-3 and ω-6 fatty acids. DHA (EE) is less polar than EPA (EE).

The process of the present invention involves multiple chromatography separation steps.

The first separation step is effective to remove saturated and/or monounsaturated fatty acids present in the feed mixture and may be carried out using a stationary bed or simulated or actual moving bed chromatography apparatus.

When the first separation step comprises purifying the feed mixture in a simulated or actual moving bed chromatography apparatus, there are several ways in which the three separation steps may be realised. Four preferred ways of carrying out the process are given as first, second, third and fourth embodiments below.

In a first embodiment, the first, second and third separation steps are carried out simultaneously in a single simulated or actual moving bed chromatography apparatus having a plurality of linked chromatography columns containing, as eluent, an aqueous organic solvent, the first, second and third separation steps being carried out in first, second and third zones respectively, wherein each zone has one or more injection points for a feed mixture stream, one or more injection points for water and/or organic solvent, a raffinate take-off stream from which liquid can be collected from said zone, and an extract take-off stream from which liquid can be collected from said zone.

Typically, each zone has only one injection point for a feed mixture. In one embodiment, each zone has only one injection point for the aqueous organic solvent eluent. In another embodiment, each zone has two or more injection points for water and/or organic solvent.

Typically each zone used has a single array of chromatography columns linked in series containing, as eluent, an aqueous organic solvent. Typically, each of the chromatography columns in a zone are linked to the two columns in the apparatus adjacent to that column. Thus, the output from a given column in a zone is connected to the input of the adjacent column, for example in the zone, which is downstream with respect to the flow of eluent in the system. Typically, none of the chromatography columns in a zone are linked to non-adjacent columns in the same zone.

The term "raffinate" is well known to the person skilled in the art. In the context of actual and simulated moving bed chromatography it refers to the stream of components that move more rapidly with the liquid eluent phase compared with the solid adsorbent phase. Thus, a raffinate stream is typically enriched with more polar components, and depleted of less polar components compared with a feed stream.

The term "extract" is well known to the person skilled in the art. In the context of actual and simulated moving bed chromatography it refers to the stream of components that move more rapidly with the solid adsorbent phase compared with the liquid eluent phase. Thus, an extract stream is typically enriched with less polar components, and depleted of more polar components compared with a feed stream.

As used herein the term "nonadjacent" refers to columns, in for example the same apparatus, separated by one or more columns, preferably 3 or more columns, more preferably 5 or more columns, most preferably about 5 columns.

In a second embodiment, the first and second separation steps are carried out simultaneously in a single simulated or actual moving bed chromatography apparatus having a plurality of linked chromatography columns containing, as eluent, an aqueous organic solvent, the first and second separation steps being carried out in first and second zones respectively, wherein each zone is as defined herein, and wherein the third separation step is carried out in a separate simulated or actual moving bed chromatography apparatus.

In the second embodiment, the third separation step is typically carried out in a simulated or actual moving bed chromatography apparatus comprising a plurality of linked chromatography columns containing, as eluent, an aqueous organic solvent, and having one or more injection points for a feed mixture stream, one or more injection points for water and/or organic solvent, a raffinate take-off stream from which liquid can be collected from said plurality of linked chromatography columns, and an extract take-off stream from which liquid can be collected from said plurality of linked chromatography columns. This chromatography apparatus typically has only one injection point for a feed mixture. In one embodiment, this chromatography apparatus has only one injection point for the aqueous organic solvent eluent. In another embodiment, this chromatography apparatus has two or more injection points for water and/or organic solvent.

The chromatography apparatus used in the third separation step in the second embodiment typically has a single array of chromatography columns linked in series containing, as eluent, an aqueous organic solvent. Typically, each of the chromatography columns are linked to the two columns in the apparatus adjacent to that column. Thus, the output from a given column is connected to the input of the adjacent column, which is downstream with respect to the flow of eluent in the system. Typically, none of the chromatography columns are linked to non-adjacent columns in the chromatography apparatus.

The chromatography apparatus used in the third separation step in the second embodiment is a separate apparatus from the apparatus used in the first and second separation steps. Thus, two separate apparatuses are used. Eluent circulates separately in the separate chromatographic apparatuses. Thus, eluent is not shared between the separate chromatographic apparatuses other than what eluent may be present as solvent in the second intermediate product which is produced in the second step, and which is then introduced into the chromatographic apparatus used in the third separation step. Chromatographic columns are not shared between the separate chromatographic apparatuses.

After the second intermediate product is obtained in the second separation step, the aqueous organic solvent eluent may be partly or totally removed before the second intermediate product is purified further in the third separation step. Alternatively, the intermediate product may be purified further in the third step without the removal of any solvent present.

The chromatography apparatus used in the third separation step in the second embodiment is similar to the chromatography apparatus illustrated in FIG. 1.

In a third embodiment, the second and third separation steps are carried out simultaneously in a single simulated or actual moving bed chromatography apparatus having a plurality of linked chromatography columns containing, as eluent, an aqueous organic solvent, the second and third separation steps being carried out in first and second zones respectively, wherein each zone is as defined herein, and wherein the first separation step is carried out in a separate simulated or actual moving bed chromatography apparatus.

In the third embodiment, the first separation step is typically carried out in a simulated or actual moving bed chromatography apparatus comprising a plurality of linked chromatography columns containing, as eluent, an aqueous organic solvent, and having one or more injection points for a feed mixture stream, one or more injection points for water and/or organic solvent, a raffinate take-off stream from which liquid can be collected from said plurality of linked chromatography columns, and an extract take-off stream from which liquid can be collected from said plurality of linked chromatography columns. This chromatography apparatus typically has only one injection point for a feed mixture. In one embodiment, this chromatography apparatus has only one injection point for the aqueous organic solvent eluent. In another embodiment, this chromatography apparatus has two or more injection points for water and/or organic solvent.

The chromatography apparatus used in the first separation step in the third embodiment typically has a single array of chromatography columns linked in series containing, as eluent, an aqueous organic solvent. Typically, each of the chromatography columns are linked to the two columns in the apparatus adjacent to that column. Thus, the output from a given column is connected to the input of the adjacent column, which is downstream with respect to the flow of eluent in the system. Typically, none of the chromatography columns are linked to non-adjacent columns in the chromatography apparatus.

The chromatography apparatus used in the first separation step in the third embodiment is a separate apparatus from the apparatus used in the second and third separation steps. Thus, two separate apparatuses are used. Eluent is not shared between the separate chromatographic apparatuses other than what eluent may be present as solvent in the first intermediate product which is produced in the first step, and which is introduced into the chromatographic apparatus used in the second separation step. Chromatographic columns are not shared between the separate chromatographic apparatuses.

After the first intermediate product is obtained in the first separation step, the aqueous organic solvent eluent may be partly or totally removed before the intermediate product is purified further in the next separation step. Alternatively, the first intermediate product may be purified further in the second separation step without the removal of any solvent present.

The chromatography apparatus used in the first separation step in the third embodiment is similar to the chromatography apparatus illustrated in FIG. 1.

It will be appreciated that in the first, second and third embodiments above two or more separation steps may take place simultaneously in a single simulated or actual moving bed chromatography apparatus having two or three zones, wherein a zone is as defined above. A typical chromatography apparatus having two or more zones, for example two or three zones, is as described in, for example, PCT/GB10/002339, which is incorporated herein by reference.

In a fourth embodiment, either (a) the first, second and third separation steps are carried out sequentially on the same chromatography apparatus, first and second intermediate products being recovered between the first and second, and second and third separation steps respectively, and the process conditions in the chromatography apparatus being adjusted between the first and second, and second and third separation steps such that saturated and/or monounsaturated fatty acids present in the feed mixture are removed in the first separation step, and the PUFA product is separated from different components of the feed mixture in steps (ii) and (iii); or (b) the second separation step is carried out using a different chromatographic apparatus to that used in the first separation step, and/or the third separation step is carried out using a different chromatographic apparatus to that used in the second separation step.

In the fourth embodiment, each of the chromatography apparatuses used to carry out the first, second and third separation steps is typically as defined above for the third separation step in embodiment (2).

In option (b) of the fourth embodiment, all three steps are carried out on separate chromatographic apparatuses. Two or three of the first, second and third separation steps are carried out on two or three different separate chromatographic apparatuses. These may be operated sequentially or simultaneously.

In particular, in option (b) of the fourth embodiment two separate chromatography apparatuses may be operated sequentially to carry out the first and second separation steps. In this case, the first intermediate product is recovered between the first and second separation steps and the process conditions in the first and second chromatography apparatuses are adjusted such that saturated and/or monounsaturated fatty acids present in the feed mixture are removed in the first separation step and the PUFA product is separated from different components of the feed mixture in steps (ii) and (iii).

In particular, in option (b) of the fourth embodiment two separate chromatography apparatuses may be operated sequentially to carry out the second and third separation steps. In this case, the second intermediate product is recovered between the second and third separation steps and the process conditions in the second and third chromatography apparatuses are adjusted such that saturated and/or monounsaturated fatty acids present in the feed mixture are removed in the first separation step and the PUFA product is separated from different components of the feed mixture in steps (ii) and (iii).

In particular, in option (b) of the fourth embodiment three separate chromatography apparatuses may be operated sequentially to carry out the first, second and third separation steps. In this case, the first intermediate product is recovered between the first and second separation steps, the second intermediate product is recovered between the second and third separation steps and the process conditions in the first, second and third chromatography apparatuses are adjusted such that saturated and/or monounsaturated fatty acids present in the feed mixture are removed in the first separation step and the PUFA product is separated from different components of the feed mixture in steps (ii) and (iii).

In particular, in option (b) of the fourth embodiment, two separate chromatography apparatuses may be operated simultaneously to carry out the first and second separation steps. The first and second separation steps are carried out on separate chromatography apparatuses, the first intermediate product obtained in the first step being introduced into the chromatography apparatus used in the second separation step, and the process conditions in the chromatography apparatuses being adjusted such that saturated and/or monounsaturated fatty acids present in the feed mixture are removed in the first separation step and the PUFA product is separated from different components of the feed mixture in steps (ii) and (iii).

In particular, in option (b) of the fourth embodiment, two separate chromatography apparatuses may be operated simultaneously to carry out the second and third separation steps. The second and third separation steps are carried out on separate chromatography apparatuses, the second intermediate product obtained in the second step being introduced into the chromatography apparatus used in the third separation step, and the process conditions in the chromatography apparatuses being adjusted such that saturated and/or monounsaturated fatty acids present in the feed mixture are removed in the first separation step and the PUFA product is separated from different components of the feed mixture in steps (ii) and (iii).

In particular, in option (b) of the fourth embodiment, three separate chromatography apparatuses may be operated simultaneously to carry out the first, second and third separation steps. The first, second and third separation steps are carried out on separate chromatography apparatuses, the first intermediate product obtained in the first step being introduced into the chromatography apparatus used in the second separation step, the second intermediate product obtained in the second step being introduced into the chromatography apparatus used in the third separation step, and the process conditions in the chromatography apparatuses being adjusted such that saturated and/or monounsaturated fatty acids present in the feed mixture are removed in the first separation step and the PUFA product is separated from different components of the feed mixture in steps (ii) and (iii).

In particular, in option (b) of the fourth embodiment, two or three separate chromatographic apparatuses are operated. Eluent circulates separately in the separate chromatographic apparatuses. Thus, eluent is not shared between the separate chromatographic apparatuses other than what eluent may be present as solvent in the intermediate product which is purified in the first and/or second step, and which is introduced into the chromatographic apparatus used in the next separation step. Chromatographic columns are not shared between the separate chromatographic apparatuses used in the first and second and/or second and third separation steps.

After the intermediate product is obtained in the first and/or second separation step, the aqueous organic solvent eluent may be partly or totally removed before the intermediate product is purified further in the next separation step. Alternatively, the intermediate product may be purified further without the removal of any solvent present. These considerations also apply for the second intermediate product obtained in the second separation step in embodiment (2) above, and for the first intermediate product obtained in the first separation step in embodiment (3) above.

In general, any known stationary bed or simulated or actual moving bed chromatography apparatus may be utilised for the purposes of the method of the present invention, as long as the apparatus is used in accordance with the process of the present invention. Those apparatuses described in PCT/GB10/002339, U.S. Pat. No. 2,985,589, U.S. Pat. No. 3,696,107, U.S. Pat. No. 3,706,812, U.S. Pat. No. 3,761,533, FR-A-2103302, FR-A-2651148, FR-A-2651149, U.S. Pat. No. 6,979,402, U.S. Pat. No. 5,069,883 and U.S. Pat. No. 4,764,276 may all be used if configured in accordance with the process of the present invention.

The second, third and fourth embodiments above are preferred. The third and fourth embodiments are more preferred. For certain applications, the third embodiment will be most suitable. In other applications, the fourth embodiment will be most suitable.

Figure 2:
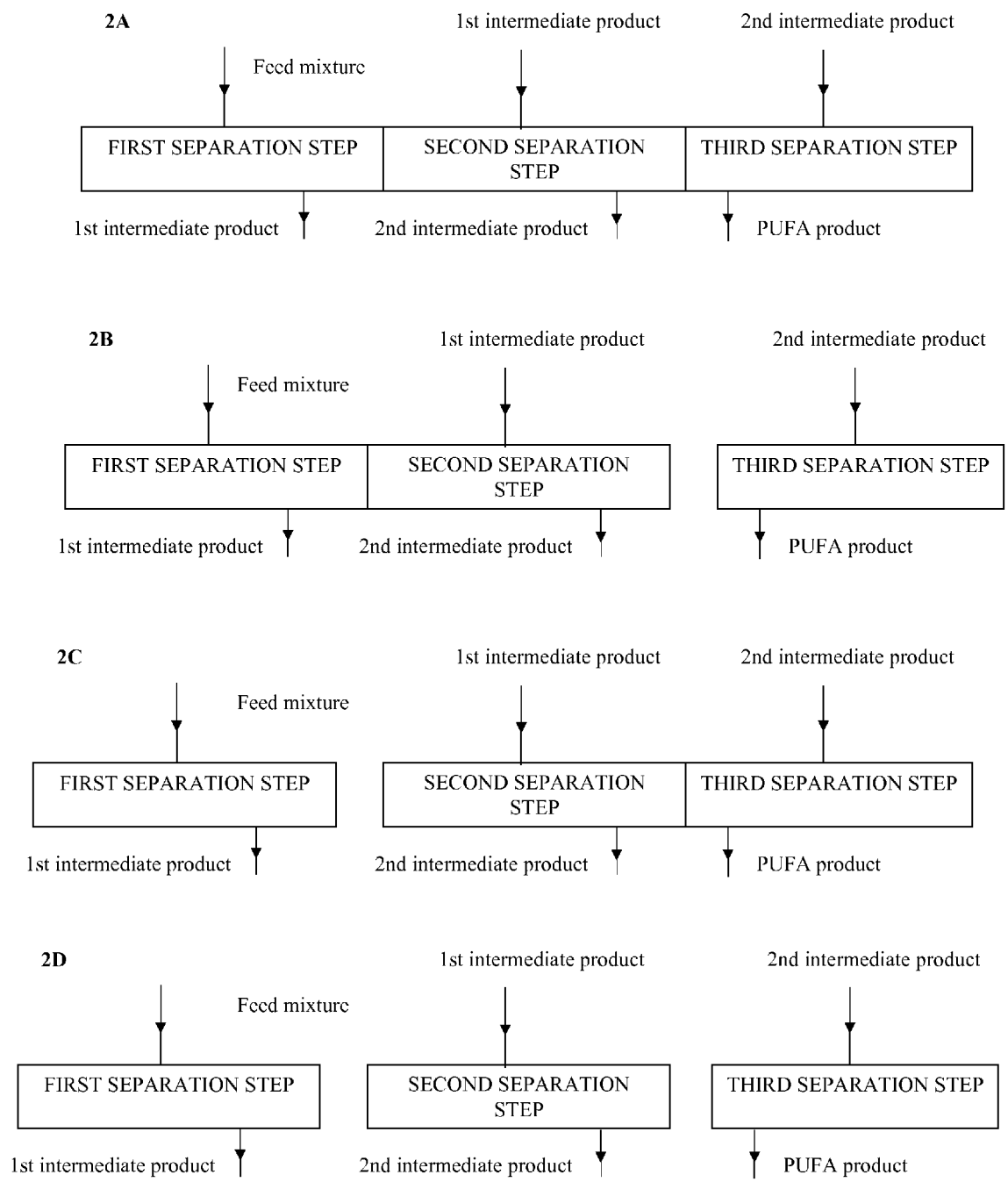
FIG. 2 illustrates three ways in which the chromatographic separation process of the invention may be carried out.

The first to fourth embodiments are illustrated in more detail with reference to FIG. 2. In all four embodiments in FIG. 2 the flow of eluent is from right to left, and the effective flow of adsorbent is from left to right. It can be seen in all cases that the first intermediate product obtained from the first separation step is used as the feed mixture for the second separation step, and the second intermediate product is used as the feed mixture for the third separation step.

Referring now to FIG. 2A, this illustrates the first embodiment above, i.e. where the first, second and third separation steps are carried out in a single simulated or actual moving bed chromatography apparatus in first, second and third zones respectively. The first separation step takes place in the first zone. Then the first intermediate product from the first separation step carried out in the first zone is passed into the second zone as the feed mixture. The second separation step is then carried out in the second zone. The second intermediate product is then passed from the second separation step carried out in the second zone into the third zone as the feed mixture. The third separation step is then carried out in the third zone.

Referring now to FIG. 2B, this illustrates the second embodiment above, i.e. where the first and second separation steps are carried out simultaneously in a single simulated or actual moving bed chromatography apparatus in first and second zones respectively, and the third separation step is carried out in a separate simulated or actual moving bed chromatography apparatus. The first separation step takes place in the first zone. Then the first intermediate product from the first separation step carried out in the first zone is passed into the second zone as the feed mixture. The second separation step is carried out in the second zone. The second intermediate product is collected from the second zone. This is then introduced into a chromatography apparatus as the feed mixture for the third separation step.

Referring now to FIG. 2C, this illustrates the third embodiment above, i.e. where the second and third separation steps are carried out simultaneously in a single simulated or actual moving bed chromatography apparatus in first and second zones respectively, and the first separation step is carried out in a separate simulated or actual moving bed chromatography apparatus. The first separation step takes place in a chromatography apparatus. The first intermediate product is collected from the first apparatus. This is then introduced into a separate chromatography apparatus as the feed mixture for the second separation step. The second separation step is carried out in the first zone of the chromatographic apparatus in which the second and third separation steps take place. The second intermediate product from the second separation step carried out in the first zone is passed into the second zone as the feed mixture for the third separation step. The third separation step takes place in the second zone.

Referring now to FIG. 2D, this illustrates the fourth embodiment above, i.e. where (a) the first, second and third separation steps are carried out sequentially on the same chromatography apparatus, first and second intermediate products being recovered between the first and second, and second and third separation steps respectively, and the process conditions in the chromatography apparatus being adjusted between the first and second, and second and third separation steps such that saturated and/or monounsaturated fatty acids present in the feed mixture are removed in the first separation step, and the PUFA product is separated from different components of the feed mixture in steps (ii) and (iii); or (b) two or three of the first, second and third separation steps are carried out on two or three different separate apparatuses; wherein the second separation step is carried out using a different chromatographic apparatus to that used in the first separation step, and/or the third separation step is carried out using a different chromatographic apparatus to that used in the second separation step.

When the first separation step comprises purifying the feed mixture in a stationary bed chromatography apparatus, there are several ways in which the three separation steps may be realised. Thus typically, (a) the second and third separation steps are carried out simultaneously in a single simulated or actual moving bed chromatography apparatus having a plurality of linked chromatography columns containing, as eluent, an aqueous organic solvent, the second and third separation steps being carried out in first and second zones respectively, wherein each zone is as defined herein; or (b) the second and third separation steps are carried out sequentially on the same chromatography apparatus, the second intermediate product being recovered between the second and third separation steps and the process conditions in the chromatography apparatus being adjusted between the second and third separation steps such that the PUFA product is separated from different components of the feed mixture in steps (ii) and (iii); or (c) the second and third separation steps are carried out on separate chromatography apparatuses respectively, the intermediate product obtained from the second separation step being introduced into the chromatography apparatus used in the third separation step.

Embodiment (a) above is carried out in a similar manner to the second and third separation steps in embodiment (3) above.

The chromatography apparatuses used in embodiments (b) and (c) above is typically as defined above for the third separation step in embodiment (2). Embodiments (b) and (c) are typically carried out in a similar manner to embodiment (4) above.

It will be appreciated that in certain embodiments, two or three separation steps may be carried out simultaneously in a single chromatography apparatus having two or three zones respectively. In simulated or actual moving bed chromatography apparatuses in which two separation steps are carried out simultaneously in two zones, a raffinate or extract stream is typically collected from a column in the first zone and introduced to a nonadjacent column in the second zone. In simulated or actual moving bed chromatography apparatuses in which three separation steps are carried out simultaneously in three zones, a raffinate or extract stream is typically collected from a column in the first zone and introduced to a nonadjacent column in the second zone, and a raffinate or extract stream is typically collected from a column in the second zone and introduced to a nonadjacent column in the third zone. This enables the first and/or second intermediate products collected in the first and/or second separation steps to be used as the feed mixture for the next separation step.

Typically, the second intermediate product is collected as the raffinate stream in the second separation step, and the PUFA product is collected as the extract stream in the third separation step; or the second intermediate product is collected as the extract stream in the second separation step, and the PUFA product is collected as the raffinate stream in the third separation step.

Preferably, the second intermediate product is collected as the raffinate stream in the second separation step, and the PUFA product is collected as the extract stream in the third separation step.

Typically, in embodiments where the second and third separation steps are carried out simultaneously in a single simulated or actual moving bed chromatography apparatus in first and second zones respectively, (a) the second intermediate product is collected as a raffinate stream containing the PUFA product together with more polar components from a column in the first zone and introduced to a nonadjacent column in the second zone, where the PUFA product is then collected as the extract stream in the third separation step carried out in the second zone; or (b) the second intermediate product is collected as an extract stream containing the PUFA product together with less polar components from a column in the first zone and introduced to a nonadjacent column in the second zone, where the PUFA product is then collected as the raffinate stream in the third separation step carried out in the second zone.

Preferably, in embodiments where the second and third separation steps are carried out simultaneously in a single simulated or actual moving bed chromatography apparatus in first and second zones respectively, the second intermediate product is collected as a raffinate stream containing the PUFA product together with more polar components from a column in the first zone and introduced to a nonadjacent column in the second zone, where the PUFA product is then collected as the extract stream in the third separation step which is carried out in the second zone.

When the first separation step comprises purifying the feed mixture in a simulated or actual moving bed chromatography apparatus, the first intermediate product is typically collected as the raffinate stream in the first separation step.

When the first separation step comprises purifying the feed mixture in a simulated or actual moving bed chromatography apparatus, the first intermediate product is typically collected as the raffinate stream in the first separation step and (a) the second intermediate product is collected as the raffinate stream in the second separation step, and the PUFA product is collected as the extract stream in the third separation step; or (b) the second intermediate product is collected as the extract stream in the second separation step, and the PUFA product is collected as the raffinate stream in the third separation step.

Typically, the first intermediate product obtained in the first separation step is enriched in the PUFA product compared to the feed mixture; and/or the second intermediate product obtained in the second separation step is enriched in the PUFA product compared to the first intermediate product.

Preferably the first intermediate product obtained in the first separation step is enriched in the PUFA product compared to the feed mixture and the second intermediate product obtained in the second separation step is enriched in the PUFA product compared to the first intermediate product.

Typically, the first intermediate product obtained in the first separation step is depleted in saturated and/or monounsaturated fatty acids compared to the feed mixture.

Typically, in the first step the PUFA product is separated from components of the feed mixture which are less polar than the PUFA product, in the second step the PUFA product is separated from components of the feed mixture which are less polar than the PUFA product but more polar than the components separated in the first separation step, and in the third separation step the PUFA product is separated from components which are more polar than the PUFA product.

Alternatively, in the first step the PUFA product is separated from components of the feed mixture which are less polar than the PUFA product, in the second step the PUFA product is separated from components of the feed mixture which are more polar than the PUFA product, and in the third separation step the PUFA product is separated from components which are less polar than the PUFA product but more polar than the components separated in the first separation step.

The components of the feed mixture separated in the first step which are less polar than the PUFA product are typically unsaturated and/or monounsaturated fatty acids.

The components of the feed mixture which are less polar than the PUFA product but more polar than the components separated in the first separation step typically include DHA or a DHA derivative and/or other PUFAs or PUFA derivatives which are less polar than the PUFA product but more polar than the components separated in the first separation step.

The components of the feed mixture which are more polar than the PUFA product include SDA or an SDA derivative and/or other PUFAs which are more polar than the PUFA product.

PUFAs other than EPA are well known and include $\omega$-3 and $\omega$-6 PUFAs. Examples of $\omega$-3 PUFAs include alpha-linolenic acid (ALA), stearidonic acid (SDA), eicosatrienoic acid (ETE), eicosatetraenoic acid (ETA), docosapentaenoic acid (DPA) and docosahexaenoic acid (DHA). Examples of $\omega$-6 PUFAs include linoleic acid (LA), gamma-linolenic acid (GLA), eicosadienoic acid, dihomo-gamma-linolenic acid (DGLA), arachidonic acid (ARA), docosadienoic acid, adrenic acid and docosapentaenoic ($\omega$-6) acid.

The number of columns used in each separation step is not particularly limited. A skilled person would easily be able to determine an appropriate number of columns to use. The number of columns is typically 4 or more, preferably 6 or more, more preferably 8 or more, for example 4, 5, 6, 7, 8, 9, or 10 columns. In preferred embodiment, 5 or 6 columns, more preferably 6 columns are used. In another preferred embodiment, 7 or 8 columns, more preferably 8 columns are used. Typically, there are no more than 25 columns, preferably no more than 20, more preferably no more than 15.

In embodiments where two separation steps take place simultaneously in a single chromatography apparatus in first and second zones respectively, the number of columns in each zone is typically 4 or more, preferably 6 or more, more preferably 8 or more, for example 4, 5, 6, 7, 8, 9, or 10 columns.

In embodiments where three separation steps take place simultaneously in a single chromatography apparatus in first, second and third zones respectively, the number of columns in each zone is typically 4 or more, preferably 6 or more, more preferably 8 or more, for example 4, 5, 6, 7, 8, 9, or 10 columns.

The first, second and third separation steps typically involve the same number of columns. For certain applications they may have different numbers of columns.

The dimensions of the columns used are not particularly limited, and will depend on the volume of feed mixture to be purified. A skilled person would easily be able to determine appropriately sized columns to use. The diameter of each column is typically between 10 and 1000 mm, preferably between 10 and 500 mm, more preferably between 25 and 250 mm, even more preferably between 50 and 100 mm, and most preferably between 70 and 80 mm. The length of each column is typically between 10 and 300 cm, preferably between 10 and 200 cm, more preferably between 25 and 150 cm, even more preferably between 70 and 110 cm, and most preferably between 80 and 100 cm.

The first, second and third separation steps typically involve columns having identical dimensions but may, for certain applications, they have different dimensions.

The flow rates to the column are limited by maximum pressures across the series of columns and will depend on the column dimensions and particle size of the solid phases. One skilled in the art will easily be able to establish the required flow rate for each column dimension to ensure efficient desorption. Larger diameter columns will in general need higher flows to maintain linear flow through the columns.

For the typical column sizes outlined above, typically the flow rate of eluent into the chromatographic apparatus used in the first or second separation step is from 1 to 4.5 L/min, preferably from 1.5 to 2.5 L/min. Typically, the flow rate of the extract from the chromatographic apparatus used in the first or second separation step is from 0.1 to 2.5 L/min, preferably from 0.5 to 2.25 L/min. In embodiments where part of the extract from the first or second separation step is recycled back into the apparatus used in the first or second separation step, the flow rate of recycle is typically from 0.7 to 1.4 L/min, preferably about 1 L/min. Typically, the flow rate of the raffinate from the chromatographic apparatus used in the first or second separation step is from 0.2 to 2.5 L/min, preferably from 0.3 to 2.0 L/min. In embodiments where part of the raffinate from the first or second separation step is recycled back into the apparatus used in the first or second separation step, the flow rate of recycle is typically from 0.3 to 1.0 L/min, preferably about 0.5 L/min. Typically, the flow rate of introduction of the feed mixture into the chromatographic apparatus used in the first or second separation step is from 5 to 150 mL/min, preferably from 10 to 100 mL/min, more preferably from 20 to 60 mL/min.

For the typical column sizes outlined above, typically the flow rate of eluent into the chromatographic apparatus used in the third separation step is from 1 to 4 L/min, preferably from 1.5 to 3.5 L/min. Typically, the flow rate of the extract from the chromatographic apparatus used in the third separation step is from from 0.5 to 2 L/min, preferably from 0.7 to 1.9 L/min. In embodiments where part of the extract from the third separation step is recycled back into the apparatus used in the third separation step, the flow rate of recycle is typically from 0.6 to 1.4 L/min, preferably from 0.7 to 1.1 L/min, more preferably about 0.9 L/min. Typically, the flow rate of the raffinate from the chromatographic apparatus used in the third separation step is from 0.5 to 2.5 L/min, preferably from 0.7 to 1.8 L/min, more preferably about 1.4 L/min. In embodiments where part of the raffinate from the third separation step is recycled back into the apparatus used in the third separation step, the flow rate of recycle is typically from 0.3 to 1.0 L/min, preferably about 0.5 L/min.

As the skilled person will appreciate, references to rates at which liquid is collected or removed via the various extract and raffinate streams refer to volumes of liquid removed in an amount of time, typically L/minute. Similarly, references to rates at which liquid is recycled back into an apparatus, typically to an adjacent column in the apparatus, refer to volumes of liquid recycled in an amount of time, typically L/minute.

The step time, i.e. the time between shifting the points of injection of the feed mixture and eluent, and the various take off points of the collected fractions, is not particularly limited, and will depend on the number and dimensions of the columns used, and the flow rate through the apparatus. A skilled person would easily be able to determine appropriate step times to use in the process of the present invention. The step time is typically from 100 to 1000 seconds, preferably from 200 to 800 seconds, more preferably from about 250 to about 750 seconds. In some embodiments, a step time of from 100 to 400 seconds, preferably 200 to 300 seconds, more preferably about 250 seconds, is appropriate. In other embodiments, a step time of from 600 to 900 seconds, preferably 700 to 800 seconds, more preferably about 750 seconds is appropriate.

In the process of the present invention, actual moving bed chromatography is preferred.

Conventional adsorbents known in the art for actual and simulated moving bed systems may be used in the process of the present invention. Each chromatographic column may contain the same or a different adsorbent. Typically, each column contains the same adsorbent. Examples of such commonly used materials are polymeric beads, preferably polystyrene reticulated with DVB (divinylbenzene); and silica gel, preferably reverse phase bonded silica gel with C8 or C18 alkanes, especially C18. C18 bonded reverse phase silica gel is preferred. The adsorbent used in the process of the present invention is preferably non-polar.

The shape of the adsorbent stationary phase material may be, for example, spherical or nonspherical beads, preferably substantially spherical beads. Such beads typically have a diameter of 5 to 500 microns, preferably 10 to 500 microns, more preferably 15 to 500 microns, more preferably 40 to 500 microns, more preferably 100 to 500 microns, more preferably 250 to 500 microns, even more preferably 250 to 400 microns, most preferably 250 to 350 microns. In some embodiments, beads with a diameter of 5 to 35 microns may be used, typically 10 to 30 microns, preferably 15 to 25 microns. Some preferred particle sizes are somewhat larger than particle sizes of beads used in the past in simulated and actual moving bed processes. Use of larger particles enables a lower pressure of eluent to be used in the system. This, in turn, has advantages in terms of cost savings, efficiency and lifetime of the apparatus. It has surprisingly been found that adsorbent beads of large particle size may be used in the process of the present invention (with their associated advantages) without any loss in resolution.

The adsorbent typically has a pore size of from 10 to 50 nm, preferably 15 to 45 nm, more preferably 20 to 40 nm, most preferably 25 to 35 nm.

Typically, the process of the present invention is conducted at from 15 to 55° C., preferably at from 20 to 40° C., more preferably at about 30° C. Thus, the process is typically carried out at room temperature, but may be conducted at elevated temperatures.

As mentioned above, saturated and/or monounsaturated fatty acids present in the feed mixture are removed in the first separation step and the PUFA product is separated from different components of the feed mixture in steps (ii) and (iii). This is typically effected by adjusting the process conditions in the chromatography apparatus, or zone in a chromatography apparatus in which the first, second and third separation steps are carried out.

Thus, the process conditions in the first, second and third separation steps typically vary. The process conditions which vary may include, for example, the size of the columns used, the number of columns used, the packing used in the columns, the step time of the SMB apparatus, the temperature of the apparatus, the eluent used in the separation steps, or the flow rates used in the apparatus, in particular the recycle rate of liquid collected via the extract or raffinate streams.

Preferably the process conditions which vary are the water:organic solvent ratio of the eluent used in the separation steps, and/or the recycle rate of liquid collected via the extract or raffinate streams in the separation steps. Both of these options are discussed in more detail below.

Typically, part of the extract stream from the apparatus used in the second separation step is recycled back into the apparatus used in the second separation step; and/or part of the raffinate stream from the apparatus used in the second separation step is recycled back into the apparatus used in the second separation step; and/or part of the extract stream from the apparatus used in the third separation step is recycled back into the apparatus used in the third separation step; and/or part of the raffinate stream from the apparatus used in the third separation step is recycled back into the apparatus used in the third separation step.

Preferably, part of the extract stream from the apparatus used in the second separation step is recycled back into the apparatus used in the second separation step; and part of the raffinate stream from the apparatus used in the second separation step is recycled back into the apparatus used in the second separation step; and part of the extract stream from the apparatus used in the third separation step is recycled back into the apparatus used in the third separation step; and part of the raffinate stream from the apparatus used in the third separation step is recycled back into the apparatus used in the third separation step.

When the first separation step comprises purifying the feed mixture in a simulated or actual moving bed chromatography apparatus, typically part of the extract stream from the apparatus used in the first separation step is recycled back into the apparatus used in the first separation step; and/or part of the raffinate stream from the apparatus used in the first separation step is recycled back into the apparatus used in the first separation step.

When the first separation step comprises purifying the feed mixture in a simulated or actual moving bed chromatography apparatus, preferably part of the extract stream from the apparatus used in the first separation step is recycled back into the apparatus used in the first separation step; and part of the raffinate stream from the apparatus used in the first separation step is recycled back into the apparatus used in the first separation step; and part of the extract stream from the apparatus used in the second separation step is recycled back into the apparatus used in the second separation step; and part of the raffinate stream from the apparatus used in the second separation step is recycled back into the apparatus used in the second separation step; and part of the extract stream from the apparatus used in the third separation step is recycled back into the apparatus used in the third separation step; and part of the raffinate stream from the apparatus used in the third separation step is recycled back into the apparatus used in the third separation step.

This recycle involves feeding part of the extract or raffinate stream out of the chromatography apparatus used in the first, second or third separation step back into the apparatus used in that step, typically into an adjacent column. This adjacent column is the adjacent column which is downstream with respect to the flow of eluent in the system.

When two or three separation steps are carried out simultaneously in a single chromatography in two or three zones respectively, this recycle involves recycling the particular extract or raffinate stream removed from a zone back into the same zone.

The rate at which liquid collected via the extract or raffinate stream in a particular separation step is recycled back into a chromatography apparatus or zone used in that separation step is the rate at which liquid collected via that stream is fed back into the apparatus used in that step, typically into an adjacent column, i.e. the downstream column with respect to the flow of eluent in the system.

Figure 5:
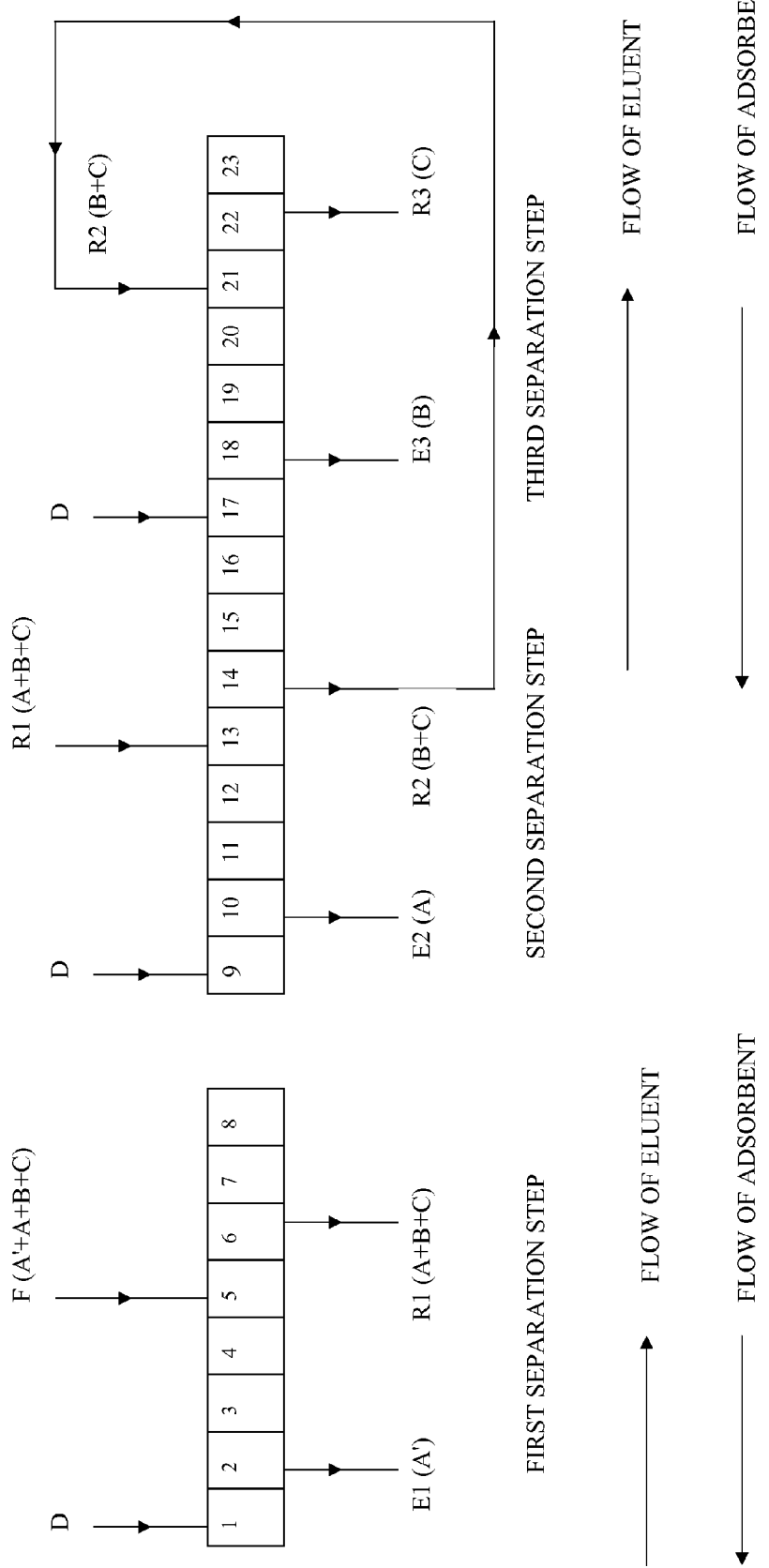
FIG. 5 illustrates a more preferred embodiment of the embodiment shown in FIG. 2.

This can be seen with reference to a preferred embodiment in FIG. 5. The rate of recycle of extract in the first separation step is the rate at which extract collected from the bottom of column 2 of the chromatographic apparatus used in the first separation step is fed into the top of column 3 of the chromatographic apparatus used in the first separation step, i.e. the flow rate of liquid into the top of column 3 of the chromatographic apparatus used in the first separation step.

The rate of recycle of extract in the second separation step is the rate at which extract collected at the bottom of column 10 of the chromatographic apparatus used in the second separation step is fed into the top of column 11 of the chromatographic apparatus used in the second separation step, i.e. the flow rate of liquid into the top of column 11 of the chromatographic apparatus used in the second separation step.

The rate of recycle of extract in the third separation step is the rate at which extract collected at the bottom of column 19 of the chromatographic apparatus used in the second separation step is fed into the top of column 19 of the chromatographic apparatus used in the second separation step, i.e. the flow rate of liquid into the top of column 19 of the chromatographic apparatus used in the second separation step.

Recycle of the extract and/or raffinate streams in the first, second and/or third separation steps is typically effected by feeding the liquid collected via that stream in that separation step into a container, and then pumping an amount of that liquid from the container back into the apparatus or zone used in that separation step, typically into an adjacent column. In this case, the rate of recycle of liquid collected via a particular extract or raffinate stream in the first and/or second separation steps, typically back into an adjacent column, is the rate at which liquid is pumped out of the container back into the chromatography apparatus or zone, typically into an adjacent column.

As the skilled person will appreciate, the amount of liquid being introduced into a chromatography apparatus via the eluent and feedstock streams is balanced with the amount of liquid removed from the apparatus, and recycled back into the apparatus.

Thus, with reference to FIG. 5, for the extract stream, the flow rate of eluent (desorbent) into the chromatographic apparatus(es) used in the second and third separation steps (D) is equal to the rate at which liquid collected via the extract stream in that separation step accumulates in a container (E2 and E3) added to the rate at which extract is recycled back into the chromatographic apparatus used in that particular separation step (D-E2 and D-E3).

For the raffinate stream from a separation step, the rate at which extract is recycled back into the chromatographic apparatus used in that particular separation step (D-E1 and D-E2) added to the rate at which feedstock is introduced into the chromatographic apparatus used in that particular separation step (F and R1) is equal to the rate at which liquid collected via the raffinate stream in that particular separation step accumulates in a container (R1 and R2) added to the rate at which raffinate is recycled back into the chromatographic apparatus used in that particular separation step (D+F-E1-R1 and D+R1-E2-R2).

The rate at which liquid collected from a particular extract or raffinate stream from a chromatography apparatus or zone accumulates in a container can also be thought of as the net rate of removal of that extract or raffinate stream from that chromatography apparatus.

Typically, the rate at which liquid collected via one or both of the extract and raffinate streams in the second separation step is recycled back into the apparatus used in that separation step is adjusted such that saturated and/or monounsaturated fatty acids present in the feed mixture are removed in the first separation step, and the PUFA product is separated from different components of the feed mixture in steps (ii) and (iii); and/or wherein the rate at which liquid collected via one or both of the extract and raffinate streams in the third separation step is recycled back into the apparatus used in that separation step is adjusted such that saturated and/or monounsaturated fatty acids present in the feed mixture are removed in the first separation step, and the PUFA product is separated from different components of the feed mixture in steps (ii) and (iii).

Preferably, the rate at which liquid collected via one or both of the extract and raffinate streams in the second separation step is recycled back into the apparatus used in that separation step is adjusted such that saturated and/or monounsaturated fatty acids present in the feed mixture are removed in the first separation step, and the PUFA product is separated from different components of the feed mixture in steps (ii) and (iii); and wherein the rate at which liquid collected via one or both of the extract and raffinate streams in the third separation step is recycled back into the apparatus used in that separation step is adjusted such that saturated and/or monounsaturated fatty acids present in the feed mixture are removed in the first separation step, and the PUFA product is separated from different components of the feed mixture in steps (ii) and (iii).

When the first separation step comprises purifying the feed mixture in a simulated or actual moving bed chromatography apparatus, the rate at which liquid collected via one or both of the extract and raffinate streams in the first separation step is recycled back into the apparatus used in that separation step is typically adjusted such that saturated and/or monounsaturated fatty acids present in the feed mixture are removed in the first separation step, and the PUFA product is separated from different components of the feed mixture in steps (ii) and (iii).

Typically, the rate at which liquid collected via the extract stream in the second separation step is recycled back into the chromatography apparatus used in the second separation step differs from the rate at which liquid collected via the extract stream in the third separation step is recycled back into the chromatography apparatus used in the third separation step; and/or the rate at which liquid collected via the raffinate stream in the second separation step is recycled back into the chromatography apparatus used in the second separation step differs from the rate at which liquid collected via the raffinate stream in the third separation step is recycled back into the chromatography apparatus used in the third separation step.

When the first separation step comprises purifying the feed mixture in a simulated or actual moving bed chromatography apparatus, the rate at which liquid collected via the extract stream in the first separation step is recycled back into the chromatography apparatus used in the first separation step typically differs from the rate at which liquid collected via the extract stream in the second separation step is recycled back into the chromatography apparatus used in the second separation step; and/or the rate at which liquid collected via the raffinate stream in the first separation step is recycled back into the chromatography apparatus used in the first separation step typically differs from the rate at which liquid collected via the raffinate stream in the second separation step is recycled back into the chromatography apparatus used in the second separation step Varying the rate at which liquid collected via the extract and/or raffinate streams in the first, second and/or third separation steps is recycled back into the apparatus used in that particular separation step has the effect of varying the amount of more polar and less polar components present in the extract and raffinate streams. Thus, for example, a lower extract recycle rate results in fewer of the less polar components in that separation step being carried through to the raffinate stream. A higher extract recycle rate results in more of the less polar components in that separation step being carried through to the raffinate stream.

This can be seen, for example, in the specific embodiment of the invention shown in FIG. 5. The rate at which liquid collected via the extract stream in the second separation step is recycled back into the chromatographic apparatus used in that separation step (D-E2) will affect to what extent any of component A is carried through to the raffinate stream in the second separation step (R2).

Typically, the rate at which liquid collected via the extract stream in the second separation step is recycled back into the chromatographic apparatus used in the second separation step is faster than the rate at which liquid collected via the extract stream in the third separation step is recycled back into the chromatographic apparatus used in the third separation step. Preferably, a raffinate stream containing the PUFA product together with more polar components is collected from the second separation step and purified in the third separation step, and the rate at which liquid collected via the extract stream in the second separation step is recycled back into the chromatographic apparatus used in the second separation step is faster than the rate at which liquid collected via the extract stream in the third separation step is recycled back into the chromatographic apparatus used in the third separation step.

Alternatively, the rate at which liquid collected via the raffinate stream in the second separation step is recycled back into the chromatographic apparatus used in the second separation step is faster than the rate at which liquid collected via the raffinate stream in the third separation step is recycled back into the chromatographic apparatus used in the third separation step. Preferably, an extract stream containing the PUFA product together with less polar components is collected from the second separation step and purified in the third separation step, and the rate at which liquid collected via the raffinate stream in the second separation step is recycled back into the chromatographic apparatus used in the second separation step is faster than the rate at which liquid collected via the raffinate stream in the third separation step is recycled back into the chromatographic apparatus used in the third separation step.

Where recycle rates are adjusted such that saturated and/or monounsaturated fatty acids present in the feed mixture are removed in the first separation step, and the PUFA product is separated from different components of the feed mixture in steps (ii) and (iii), the water:organic solvent ratio of the eluents used in the separation steps where the recycle rates differ may be the same or different.

The eluent used in the process of the present invention is an aqueous organic solvent.

The aqueous organic solvent typically comprises water and one or more alcohols, ethers, esters, ketones or nitriles, or mixtures thereof.

Alcohol solvents are well known to the person skilled in the art. Alcohols are typically short chain alcohols. Alcohols typically are of formula ROH, wherein R is a straight or branched $C_1$-$C_6$ alkyl group. The $C_1$-$C_6$ alkyl group is preferably unsubstituted. Examples of alcohols include methanol, ethanol, n-propanol, propanol, n-butanol, i-butanol, s-butanol and t-butanol. Methanol and ethanol are preferred. Methanol is more preferred.

Ether solvents are well known to the person skilled in the art. Ethers are typically short chain ethers. Ethers typically are of formula R—O—R', wherein R and R' are the same or different and represent a straight or branched $C_1$-$C_6$ alkyl group. The $C_1$-$C_6$ alkyl group is preferably unsubstituted. Preferred ethers include diethylether, diisopropylether, and methyl t-butyl ether (MTBE).

Ester solvents are well known to the person skilled in the art. Esters are typically short chain esters. Esters typically are of formula R—(C=O)O—R', wherein R and R' are the same or different and represent a straight or branched $C_1$-$C_6$ alkyl group. Preferred esters include methylacetate and ethylacetate.

Ketone solvents are well known to the person skilled in the art. Ketones are typically short chain ketones. Ketones typically are of formula R—(C=O)—R', wherein R and R' are the same or different and represent a straight or branched $C_1$-$C_6$ alkyl group. The $C_1$-$C_6$ alkyl group is preferably unsubstituted. Preferred ketones include acetone, methylethylketone and methyl isobutyl ketone (MIBK).

Nitrile solvents are well known to the person skilled in the art. Nitriles are typically short chain nitriles. Nitriles typically are of formula R—CN, wherein R represents a straight or branched $C_1$-$C_6$ alkyl group. The $C_1$-$C_6$ alkyl group is preferably unsubstituted. Preferred nitriles include acetonitrile.

Typically, the aqueous organic solvent is aqueous alcohol or aqueous acetonitrile.

The aqueous organic solvent is preferably aqueous methanol or aqueous acetonitrile. Aqueous methanol is more preferred.

Typically, the eluent is not in a supercritical state. Typically, the eluent is a liquid.

Typically, the average water:organic solvent ratio, for example water:methanol ratio, of the eluent in the entire apparatus is from 0.1:99.9 to 9:91 wt %, preferably from 0.25:99.75 to 7:93 wt %, more preferably from 0.5:99.5 to 6:94 wt %.

When the aqueous organic solvent is aqueous acetonitrile, the eluent typically contains up to 30 wt % water, remainder acetonitrile. Preferably, the eluent contains from 5 to 25 wt % water, remainder acetonitrile. More preferably, the eluent contains from 10 to 20 wt % water, remainder acetonitrile. Even more preferably, the eluent contains from 15 to 25 wt % water, remainder acetonitrile.

Typically, the water:organic solvent ratio used in each separation step is adjusted such that saturated and/or mono-unsaturated fatty acids present in the feed mixture are removed in the first separation step; and the PUFA product is separated from different components of the feed mixture in steps (ii) and (iii).

Typically, the aqueous organic solvent eluent used in two or more of the separation steps has a different water:organic solvent ratio. In one embodiment, the water:organic solvent ratio used in each separation step has a different water:organic solvent ratio.

The eluting power of the eluent used in two or more of the separation steps is typically different. Depending on the choice of organic solvent, they may be more powerful desorbers than water. Alternatively, they may be less powerful desorbers than water. Acetonitrile and alcohols, for example, are more powerful desorbers than water.

In a preferred embodiment, the aqueous organic solvent eluent used in the second and third separation steps has the same water:organic solvent ratio, and the aqueous organic solvent eluent used in the first separation step has a different water:organic solvent ratio from the organic solvent eluent used in the second and third separation steps.

In this preferred embodiment, the eluting power of the eluent used in the second and third separation steps is the same; and/or the eluting power of the eluent used in the first separation step is greater than that of the eluent used in the second separation step. Preferably in this embodiment, the eluting power of the eluent used in the second and third separation steps is the same; and the eluting power of the eluent used in the first separation step is greater than that of the eluent used in the second and third separation steps. In this embodiment, when the aqueous organic solvent is aqueous alcohol or acetonitrile, the amount of alcohol or acetonitrile in the eluent used in the second and third separation steps is typically the same, and the amount of alcohol or acetonitrile in the eluent used in the first separation step is typically greater than the amount of alcohol or acetonitrile in the eluent used in the second and third separation steps. Thus, in this embodiment, the water:organic solvent ratio of the eluent in the second and third separation steps is typically the same, and the water:organic solvent ratio of the eluent in the first separation step is typically lower than the water:organic solvent ratio of the eluent in the second and third separation steps.

In this preferred embodiment, the water:organic solvent ratio of the eluent in the first separation step is typically from 0:100 to 5:95 wt %, preferably from 0.1:99.9 to 2.5:97.5 wt %, more preferably from 0.1:99.9 to 2:98 wt %, even more preferably from 0.1:99.9 to 1:99 wt %, even more preferably from 0.25:99.75 to 0.75:99.25 wt %, and most preferably about 0.5:99.5. In this preferred embodiment, the water:organic solvent ratio of the eluent in the second and third separation steps is typically from 5:95 to 11:89 wt %, preferably 6:94 to 10:90 wt %, more preferably from 7:93 to 9:91 wt %, even more preferably from 7.5:92.5 to 8.5:91.5 wt %, and most preferably about 8:92 wt %.

In this preferred embodiment, the water:organic solvent ratio of the eluent used in the first separation step is preferably from 0.1:99.9 to 1:99 wt %, and the water:organic solvent ratio of the eluent used in the second and third separation steps is preferably from 7:93 to 9:91 wt %.

In an alternative embodiment, the aqueous organic solvent eluent used in each separation step has a different water:organic solvent ratio.

In this alternative embodiment, the eluting power of the eluent used in the first separation step is greater than that of the eluent used in the second separation step; and/or the eluting power of the eluent used in the second separation step is greater than that of the eluent used in the third separation step. Preferably, a raffinate stream containing the PUFA product together with more polar components is collected from the second separation step and purified in the third separation step and the eluting power of the eluent used in the second separation step is greater than that of the eluent used in the third separation step. Alternatively, an extract stream containing the PUFA product together with less polar components is collected from the second separation step and purified in the third separation step and the eluting power of the eluent used in the second separation step is lower than that of the eluent used in the third separation step.

In practice this is achieved by varying the relative amounts of water and organic solvent used in each separation step. In this embodiment, when the aqueous organic solvent is aqueous alcohol or acetonitrile, the amount of alcohol or acetonitrile in the eluent used in the first separation step is typically greater than the amount of alcohol or acetonitrile in the eluent used in the second separation step; and/or the amount of alcohol or acetonitrile in the eluent used in the second separation step is typically greater than the amount of alcohol or acetonitrile in the eluent used in the third separation step. Thus, in this embodiment, the water:organic solvent ratio of the eluent in the first separation step is typically lower than the water:organic solvent ratio of the eluent in the second separation step; and/or the water:organic solvent ratio of the eluent in the second separation step is typically lower than the water:organic solvent ratio of the eluent in the third separation step.

It will be appreciated that the ratios of water and organic solvent in each separation step referred to above are average ratios within the totality of the chromatographic apparatus.

Typically, the water:organic solvent ratio of the eluent in each separation step is controlled by introducing water and/or organic solvent into one or more columns in the chromatographic apparatuses used in the separation steps. Thus, for example, to achieve a lower water:organic solvent ratio in the first separations step than in the second and third separation steps, water is typically introduced more slowly into the chromatographic apparatus used in the first separation step than in the second and third separation steps.

In some embodiments, essentially pure organic solvent and essentially pure water may be introduced at different points in the chromatographic apparatus used in each separation step. The relative flow rates of these two streams will determine the overall solvent profile in the chromatographic apparatus. In other embodiments, different organic solvent/water mixtures may be introduced at different points in each chromatographic apparatus used in each separation step. That will involve introducing two or more different organic solvent/water mixtures into the chromatographic apparatus used in a particular separation step, each organic solvent/water mixture having a different organic solvent:water ratio. The relative flow rates and relative concentrations of the organic solvent/water mixtures in this embodiment will determine the overall solvent profile in the chromatographic apparatus used in that separation step.

Preferably, the aqueous organic solvent eluent used in the second and third separation steps has the same water:organic solvent ratio, and the aqueous organic solvent eluent used in the first separation step has a different water:organic solvent ratio from the organic solvent eluent used in the second and third separation steps; and the rate at which liquid collected via the extract stream in the second separation step is recycled back into the chromatography apparatus used in the second separation step differs from the rate at which liquid collected via the extract stream in the third separation step is recycled back into the chromatography apparatus used in the third separation step.

More preferably, the water:organic solvent ratio of the eluent in the second and third separation steps is the same, and the water:organic solvent ratio of the eluent in the first separation step is lower than the water:organic solvent ratio of the eluent in the second and third separation steps; and the rate at which liquid collected via the extract stream in the second separation step is recycled back into the chromatographic apparatus used in the second separation step is faster than the rate at which liquid collected via the extract stream in the third separation step is recycled back into the chromatographic apparatus used in the third separation step.

Even more preferably,
the first separation step comprises purifying the feed mixture in a simulated or actual moving bed chromatography apparatus;
the second and third separation steps are carried out simultaneously in a single simulated or actual moving bed chromatography apparatus having a plurality of linked chromatography columns containing, as eluent, an aqueous organic solvent, the second and third separation steps being carried out in first and second zones respectively, wherein each zone is as defined herein, and wherein the first separation step is carried out in a separate simulated or actual moving bed chromatography apparatus;
the first intermediate product is collected as the raffinate stream in the first separation step, the second intermediate product is collected as the raffinate stream in the second separation step, and the PUFA product is collected as the extract stream in the third separation step;
the second intermediate product raffinate stream containing the PUFA product together with more polar components is collected from a column in the first zone and introduced into a nonadjacent column in the second zone;
the aqueous organic solvent eluent used in the second and third separation steps has the same water:organic solvent ratio, and the water:organic solvent ratio of the eluent used in the first separation step is lower than the water:organic solvent ratio of the eluent used in the second and third separation steps; and
the rate at which liquid collected via the extract stream in the second separation step is recycled back into the chromatographic apparatus used in the second separation step is faster than the rate at which liquid collected via the extract stream in the third separation step is recycled back into the chromatographic apparatus used in the third separation step.

It is preferred that the first separation step comprises purifying the feed mixture in a simulated or actual moving bed chromatography apparatus; and the second and third separation steps are carried out simultaneously in a single simulated or actual moving bed chromatography apparatus having a plurality of linked chromatography columns containing, as eluent, an aqueous organic solvent, the second and third separation steps being carried out in first and second zones respectively, wherein each zone is as defined herein, and wherein the first separation step is carried out in a separate simulated or actual moving bed chromatography apparatus. A preferred embodiment of this is illustrated in FIG. 3.

A feed mixture F comprising the PUFA product (B) and more polar (C) and less polar (A') and (A) components is purified in the first separation step. In the first separation step, the least polar components (e.g. saturates and/or mono-unsaturates) (A') are removed as extract stream E1. The PUFA product (B), more polar components (C) and less polar (but more polar than (A')) components (A) are collected as raffinate stream R1. Raffinate stream R1 is the intermediate product which is then purified in the second separation step.

In the second separation step, the less polar components (A) are removed as extract stream E2. The PUFA product (B) and more polar components (C) are collected as raffinate stream R2. Raffinate stream R2 is the intermediate product which is then purified in the third separation step.

In the third separation step, more polar components (C) are removed as raffinate stream R3. The PUFA product (B) is collected as extract stream E3. The second and third separation steps take place in two zones in a single SMB chromatographic apparatus.

This embodiment is illustrated in more detail in FIG. 4. FIG. 4 is identical to FIG. 2, except that the points of introduction of the aqueous organic solvent desorbent (D) into each chromatographic apparatus are shown.

Typical solvents for use in this most preferred embodiment are aqueous alcohols or aqueous acetonitrile, preferably aqueous methanol.

Typically in this preferred embodiment, the aqueous organic solvent eluent used in the second and third separation steps has the same water:organic solvent ratio, and the aqueous organic solvent eluent used in the first separation step has a different water:organic solvent ratio from the organic solvent eluent used in the second and third separation steps; and the rate at which liquid collected via the extract stream in the second separation step is recycled back into the chromatography apparatus used in the second separation step differs from the rate at which liquid collected via the extract stream in the third separation step is recycled back into the chromatography apparatus used in the third separation step.

Preferably in this preferred embodiment, the water:organic solvent ratio of the eluent in the second and third separation steps is the same, and the water:organic solvent ratio of the eluent in the first separation step is lower than the water:organic solvent ratio of the eluent in the second and third separation steps; and the rate at which liquid collected via the extract stream in the second separation step is recycled back into the chromatographic apparatus used in the second separation step is faster than the rate at which liquid collected via the extract stream in the third separation step is recycled back into the chromatographic apparatus used in the third separation step.

In this preferred embodiment the first raffinate stream in the first separation step is typically removed downstream of the point of introduction of the feed mixture into the chromatographic apparatus used in the first separation step, with respect to the flow of eluent.

In this particularly preferred embodiment, the first extract stream in the first separation step is typically removed upstream of the point of introduction of the feed mixture into the chromatographic apparatus used in the first separation step, with respect to the flow of eluent.

In this particularly preferred embodiment, the second raffinate stream in the second separation step is typically removed downstream of the point of introduction of the first intermediate product into the chromatographic apparatus used in the second separation step, with respect to the flow of eluent.

In this particularly preferred embodiment, the second extract stream in the second separation step is typically collected upstream of the point of introduction of the first intermediate product into the chromatographic apparatus used in the second separation step, with respect to the flow of eluent.

In this particularly preferred embodiment, the third raffinate stream in the third separation step is typically removed downstream of the point of introduction of the second intermediate product into the chromatographic apparatus used in the third separation step, with respect to the flow of eluent.

In this particularly preferred embodiment, the third extract stream in the third separation step is typically collected upstream of the point of introduction of the second intermediate product into the chromatographic apparatus used in the third separation step, with respect to the flow of eluent.

Typically in this preferred embodiment, the aqueous organic solvent is introduced into the chromatographic apparatus used in the first separation step upstream of the point of removal of the first extract stream, with respect to the flow of eluent.

Typically in this preferred embodiment, the aqueous organic solvent is introduced into the chromatographic apparatus used in the second separation step upstream of the point of removal of the second extract stream, with respect to the flow of eluent.

Typically in this preferred embodiment, the aqueous organic solvent is introduced into the chromatographic apparatus used in the third separation step upstream of the point of removal of the third extract stream, with respect to the flow of eluent.

A more preferred embodiment of the invention illustrated in FIGS. 3 and 4 is shown in FIG. 5. This illustrates the number of columns used in each separation step, and shows typical points of introduction of feed mixtures and eluents, and typical points of removal of extract and raffinate streams.

Thus, in this more preferred embodiment, the SMB chromatography apparatus used in the first separation step consists of eight chromatographic columns, 1 to 8. The SMB chromatography apparatus used in the second separation step consists of eight chromatographic columns, 9 to 16. The SMB chromatography apparatus used in the third separation step consists of seven chromatographic columns, 17 to 23.

In each apparatus the columns are typically arranged in series so that (in the case of the first separation step) the bottom of column 1 is linked to the top of column 2, the bottom of column 2 is linked to the top of column . . . 3 etc . . . and the bottom of column 8 is linked to the top of column 1. These linkages may optionally be via a holding container, with a recycle stream into the next column. The flow of eluent through the system is from column 1 to column 2 to column 3 etc. The effective flow of adsorbent through the system is from column 8 to column 7 to column 6 etc.

In this more preferred embodiment, a feed mixture F comprising the PUFA product (B) and more polar (C) and less polar (A') and (A) components is introduced into the top of column 5 in the chromatographic apparatus used in the first separation step. Aqueous organic solvent desorbent is introduced into the top of column 1 of the chromatographic apparatus used in the first separation step. In the first separation step, the least polar components (e.g. saturates and/or monounsaturates) (A') are removed as extract stream E1 from the bottom of column 2. The PUFA product (B), more polar components (C) and less polar (but more polar than (A')) components (A) are collected as raffinate stream R1 from the bottom of column 6.

Raffinate stream R1 is the first intermediate product which is then purified in the second separation step, by being introduced into the chromatographic apparatus used in the second separation step at the top of column 13. Aqueous organic solvent desorbent is introduced into the top of column D in the chromatographic apparatus used in the second separation step.

In the second separation step, the less polar components (A) are removed as extract stream E2 at the bottom of column 10. The PUFA product (B) and more polar components (C) are collected as raffinate stream R2 at the bottom of column 14. Raffinate stream R2 is the intermediate product which is then purified in the third separation step, by being introduced into the chromatographic apparatus used in the second separation step at the top of column 21.

In the third separation step, more polar components (C) are removed as raffinate stream R3 at the bottom of column 22. The PUFA product (B) is collected as extract stream E3 at the bottom of column 18. The second and third separation steps take place in two zones in a single SMB chromatographic apparatus.

In this more preferred embodiment, aqueous organic solvent is typically introduced into the top of column 1 of the chromatographic apparatus used in the first separation step.

In this more preferred embodiment, aqueous organic solvent is typically introduced into the top of column 9 of the chromatographic apparatus used in the second separation step.

In this more preferred embodiment, aqueous organic solvent is typically introduced into the top of column 17 of the chromatographic apparatus used in the third separation step.

In this more preferred embodiment, the feed stream is typically introduced into the top of column 5 of the chromatographic apparatus used in the first separation step.

In this more preferred embodiment, a first raffinate stream is typically collected as the first intermediate product from the bottom of column 6 of the chromatographic apparatus used in the first separation step. This first intermediate product is then purified in the second separation step and is typically introduced into the top of column 13 of the chromatographic apparatus used in the second separation step. The first raffinate stream may optionally be collected in a container before being purified in the second separation step.

In this more preferred embodiment, a first extract stream is typically removed from the bottom of column 2 of the chromatographic apparatus used in the first separation step. The first extract stream may optionally be collected in a container and reintroduced into the top of column 3 of the chromatographic apparatus used in the first separation step.

In this more preferred embodiment, a second raffinate stream is typically collected as the second intermediate product from the bottom of column 14 of the chromatographic apparatus used in the second separation step. This second intermediate product is then purified in the third separation step and is typically introduced into the top of column 21 of the chromatographic apparatus used in the third separation step. The second raffinate stream may optionally be collected in a container before being purified in the second separation step.

In this more preferred embodiment, a second extract stream is typically removed from the bottom of column 10 of the chromatographic apparatus used in the second separation step.

In this more preferred embodiment, a third extract stream is typically collected from the bottom of column 18 of the chromatographic apparatus used in the third separation step. This third extract stream typically contains the purified PUFA product. The third extract stream may optionally be collected in a container and reintroduced into the top of column 19 of the chromatographic apparatus used in the third separation step.

In this more preferred embodiment, a third raffinate stream is typically removed from the bottom of column 22 of the chromatographic apparatus used in the third separation step.

Typically in this more preferred embodiment, the aqueous organic solvent eluent used in the second and third separation steps has the same water:organic solvent ratio, and the aqueous organic solvent eluent used in the first separation step has a different water:organic solvent ratio from the organic solvent eluent used in the second and third separation steps; and the rate at which liquid collected via the extract stream in the second separation step is recycled back into the chromatography apparatus used in the second separation step differs from the rate at which liquid collected via the extract stream in the third separation step is recycled back into the chromatography apparatus used in the third separation step.

Preferably in this more preferred embodiment, the water:organic solvent ratio of the eluent in the second and third separation steps is the same, and the water:organic solvent ratio of the eluent in the first separation step is lower than the water:organic solvent ratio of the eluent in the second and third separation steps; and the rate at which liquid collected via the extract stream in the second separation step is recycled back into the chromatographic apparatus used in the second separation step is faster than the rate at which liquid collected via the extract stream in the third separation step is recycled back into the chromatographic apparatus used in the third separation step.

In this more preferred embodiment, the water:organic solvent ratio of the eluent used in the second and third separation steps is the same and is from 7:93 to 9:91 wt %, and the water:organic solvent ratio of the eluent in the first separation step is from 0.1:99.9 to 1:99 wt %.

Although these preferred and more preferred embodiments are shown as for FIG. 2C discussed above, they may also be carried out with apparatuses configured such that:

the first separation step comprises purifying the feed mixture in a simulated or actual moving bed chromatography apparatus, and the first, second and third separation steps are carried out simultaneously in a single simulated or actual moving bed chromatography apparatus having a plurality of linked chromatography columns containing, as eluent, an aqueous organic solvent, the first, second and third separation steps being carried out in first, second and third zones respectively, wherein each zone is as defined herein; or the first separation step comprises purifying the feed mixture in a simulated or actual moving bed chromatography apparatus, and the second and third separation steps are carried out simultaneously in a single simulated or actual moving bed chromatography apparatus having a plurality of linked chromatography columns containing, as eluent, an aqueous organic solvent, the second and third separation steps being carried out in first and second zones respectively, wherein each zone is as defined herein, and wherein the first separation step is carried out in a separate simulated or actual moving bed chromatography apparatus; or the first separation step comprises purifying the feed mixture in a simulated or actual moving bed chromatography apparatus, and (a) the first, second and third separation steps are carried out sequentially on the same chromatography apparatus, first and second intermediate products being recovered between the first and second, and second and third separation steps respectively, and the process conditions in the chromatography apparatus being adjusted between the first and second, and second and third separation steps such that saturated and/or monounsaturated fatty acids present in the feed mixture are removed in the first separation step, and the PUFA product is separated from different components of the feed mixture in steps (ii) and (iii); or (b) the second separation step is carried out using a different chromatographic apparatus to that used in the first separation step, and/or the third separation step is carried out using a different chromatographic apparatus to that used in the second separation step; or the first separation step comprises purifying the feed mixture in a stationary bed chromatography apparatus, and the second and third separation steps are carried out simultaneously in a single simulated or actual moving bed chromatography apparatus having a plurality of linked chromatography columns containing, as eluent, an aqueous organic solvent, the second and third separation steps being carried out in first and second zones respectively, wherein each zone is as defined herein; or the first separation step comprises purifying the feed mixture in a stationary bed chromatography apparatus, and the second and third separation steps are carried out sequentially on the same chromatography apparatus, the second intermediate product being recovered between the second and third separation steps and the process conditions in the chromatography apparatus being adjusted between the second and third separation steps such that the PUFA product is separated from different components of the feed mixture in steps (ii) and (iii); or the first separation step comprises purifying the feed mixture in a stationary bed chromatography apparatus, and the second and third separation steps are carried out on separate chromatography apparatuses respectively, the intermediate product obtained from the second separation step being introduced into the chromatography apparatus used in the third separation step.

The process of the invention allows much higher purities of PUFA product to be achieved than have been possible with conventional chromatographic techniques. PUFA products produced by the process of the invention also have particularly advantageous impurity profiles, which are quite different from those observed in oils prepared by known techniques. The present invention therefore also relates to compositions comprising a PUFA product, for example one obtainable by the process of the present invention.

In practice, the process of the present invention will generally be controlled by a computer. The present invention therefore also provides a computer program for controlling a chromatographic apparatus as defined herein, the computer program containing code means that when executed instruct the apparatus to carry out the process of the invention.

The following Examples illustrate the invention.

EXAMPLES

Example 1

Figure 7:
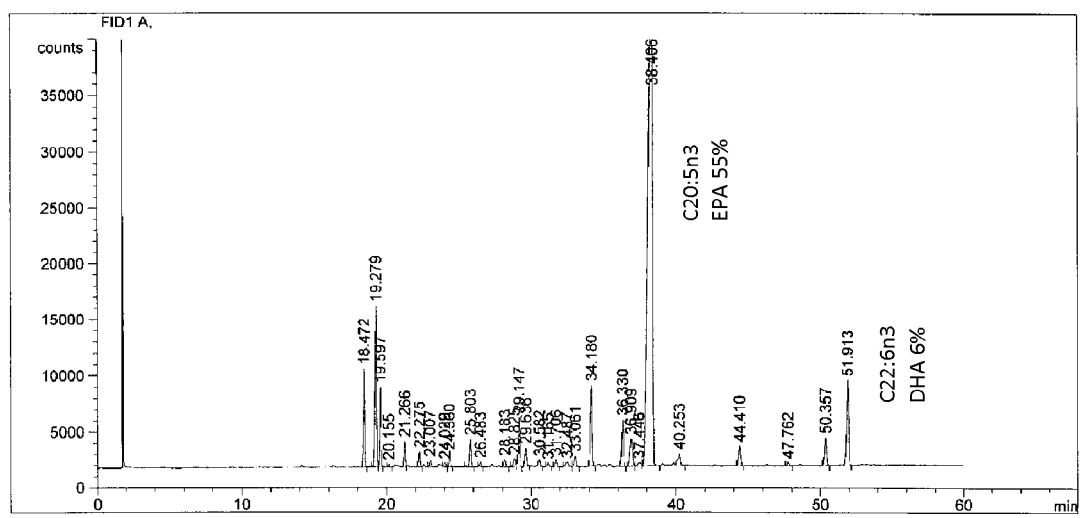
FIG. 7 shows a GC trace of a suitable feed stock for use in accordance with the process of the present invention.

A fish oil derived feedstock (55 weight % EPA EE, 5 weight % DHA EE) is fractionated using an actual moving bed chromatography system using bonded C18 silica gel as stationary phase and aqueous methanol as eluent according to the system schematically illustrated in FIG. 5. A GC trace of the feed mixture is shown as FIG. 7.

Figure 8:
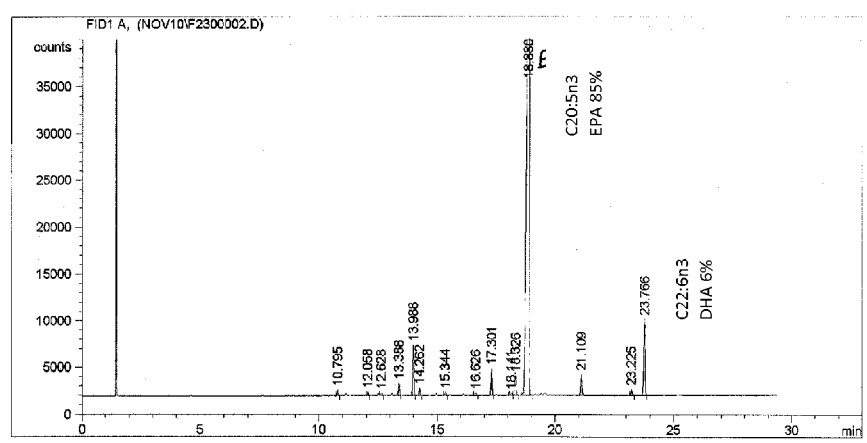
FIG. 8 shows a GC trace of a first intermediate product produced in accordance with the process of the present invention.

In a first separation step, the feed mixture was passed through an SMB apparatus having 8 columns 1 to 8 (diameter: 152 mm, length: 813 mm) connected in series as shown FIG. 5. Process conditions were adjusted to remove saturated and monounsaturated components from the feed mixture as the extract stream. A 0.5:99.5 wt % water:methanol eluent was used. The raffinate stream was retained as the first intermediate product. A GC trace of the first intermediate product is shown as FIG. 8.

Figure 9:
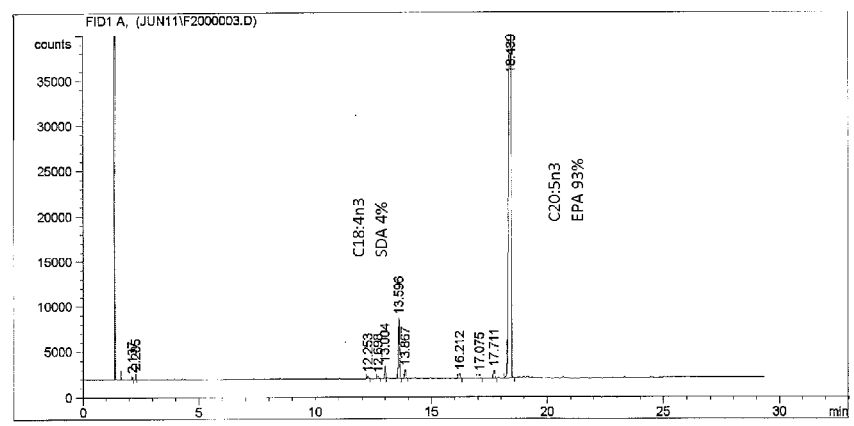
FIG. 9 shows a GC trace of a second intermediate product produced in accordance with the process of the present invention.

The first intermediate product was passed through an SMB apparatus having two zones with eight columns, columns 9 to 16, in the first zone and seven columns, columns 17 to 23, in the second zone. An 8:92 wt % water:methanol eluent was used in both first and second zones, i.e. in both the second and third separation steps. The process conditions in the first zone were adjusted to purify EPA from the slower running components such as DHA, which were removed as the extract stream. The raffinate stream was retained as the second intermediate product. A GC trace of the second intermediate product is shown as FIG. 9.

Figure 10:
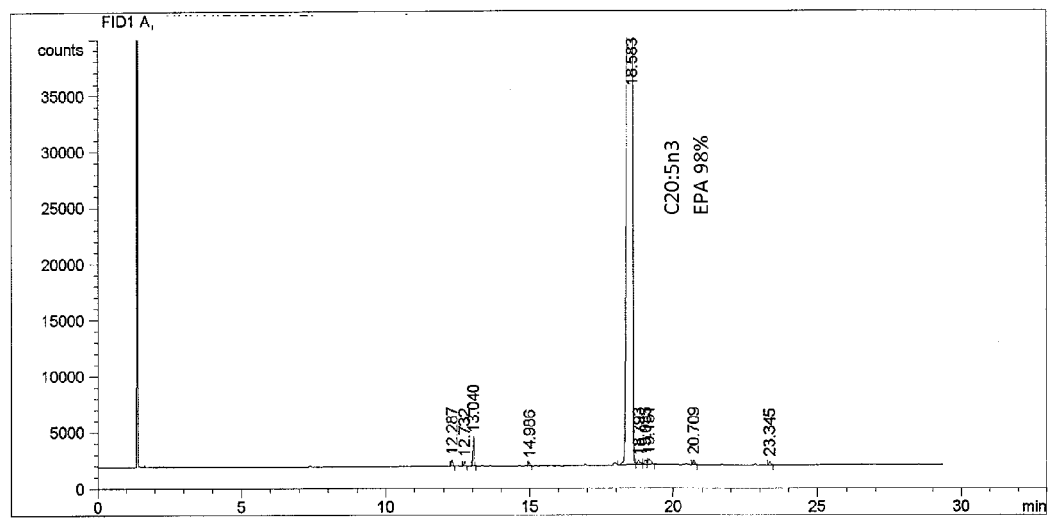
FIG. 10 shows a GC trace of a PUFA product produced in accordance with the process of the present invention.

The second intermediate product was then introduced into the second zone and separated from the faster running components, which were removed as a raffinate stream. High purity EPA was collected as the extract stream from the second zone. A GC trace of the EPA PUFA product is shown as FIG. 10.

EPA was produced with a final purity of greater than 97%.

It can be seen that for the three separation steps taken together, the overall rate of accumulation of extract (E1+E2+E3) 3876 ml/min.

The process conditions for each separation step are as follows:

First Separation Step
Feedstock feed rate: 94 ml/min
Desorbent feed rate: 6250 ml/min
Extract accumulation rate: 1250 ml/min
Extract recycle rate: 5000 ml/min
Raffinate accumulation rate: 1688 ml/min
Cycle time: 600 secs Second Separation Step
First intermediate product feed rate: 40 ml/min
Desorbent feed rate: 6313 ml/min
Extract accumulation rate: 1188 ml/min
Extract recycle rate: 5125 ml/min
Raffinate accumulation rate: 1625 ml/min
Cycle time: 1200 secs Third Separation Step
Second intermediate product feed rate: 40 ml/min
Desorbent feed rate: 6189 ml/min
Extract accumulation rate: 1438 ml/min
Extract recycle rate: 4750 ml/min
Raffinate accumulation rate: 1438 ml/min
Cycle time: 1080 secs Comparative Example 1

An experiment was carried out to produce a PUFA product containing greater than 97% EPA from the same feed mixture as was used in Example 1. However, instead of using a three step separation process in accordance with the present invention, only two separation steps were used. Thus, the process was carried out in accordance with the process disclosed in PCT/GB10/002339, and as illustrated in FIG. 6.

Figure 6:
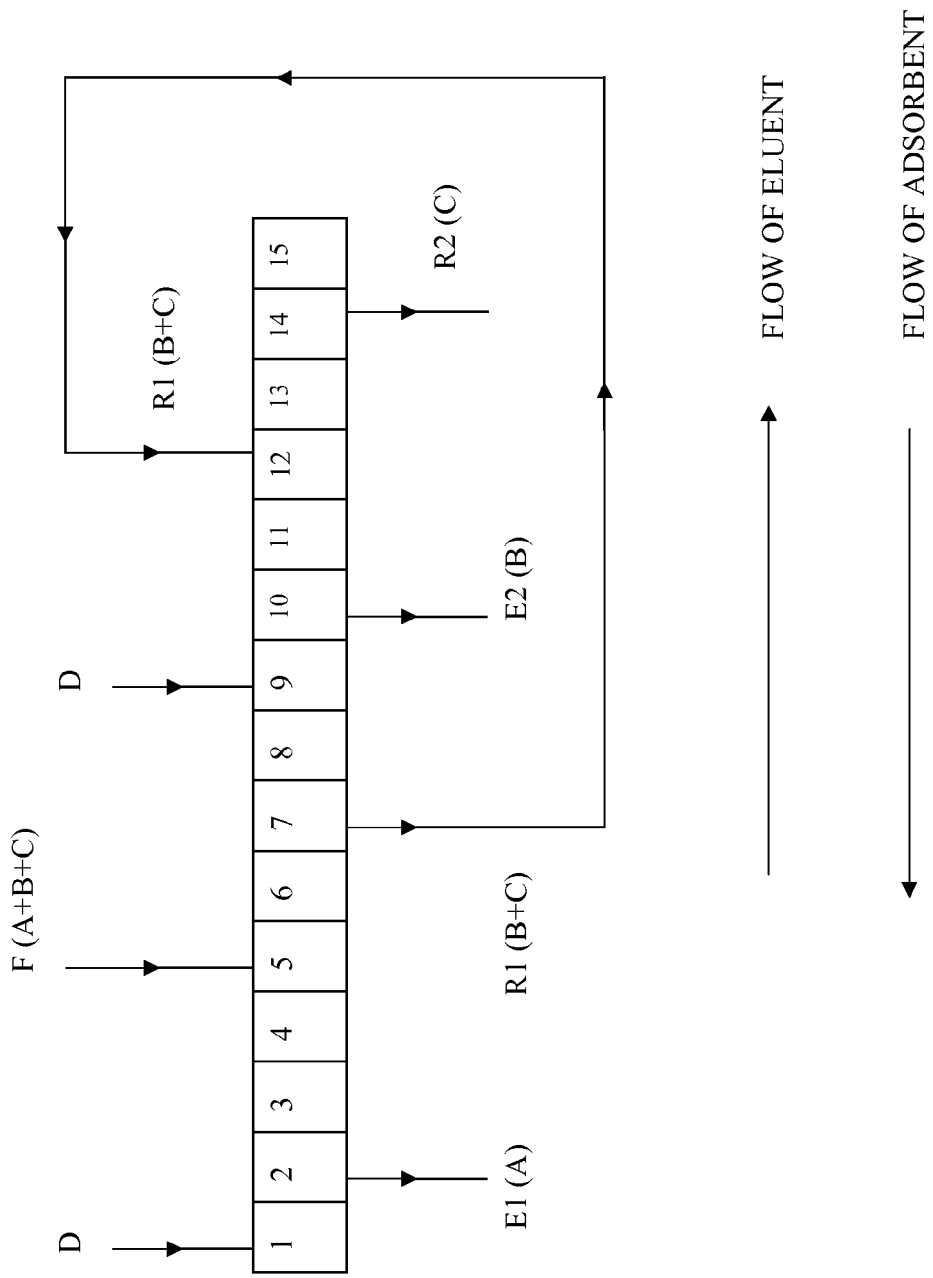
FIG. 6 illustrates a two-stage separation process for producing EPA (not in accordance with the present invention).

A single chromatographic apparatus having two zones was used as shown in FIG. 6. The first zone contains 8 columns (diameter: 24", length: 32") and the second zone 7 columns (diameter: 24", length: 32"). Process conditions were adjusted to separate the EPA PUFA product from less polar components of the feed mixture in the first zone, and more polar components of the feed mixture in the second zone. An 8:92 wt % water:methanol eluent was used in both zones.

EPA was produced with a final purity of greater than 97%.

It can be seen that for the two separation steps taken together, the overall rate of accumulation of extract (E1+E2) was 10571 ml/min. Thus, it can be seen that a much higher volume of aqueous organic solvent is required to recover the PUFA product compared with the three step process of the invention.

The process conditions for the separation steps are as follows:
First Separation Step
Feed mixture feed rate: 34 ml/min
Desorbent feed rate: 14438 ml/min
Extract accumulation rate: 9313 ml/min
Extract recycle rate: 5125 ml/min
Raffinate accumulation rate: 1688 ml/min
Cycle time: 1200 secs
Third Separation Step
Intermediate product feed rate: 40 ml/min
Desorbent feed rate: 6189 ml/min
Extract accumulation rate: 1438 ml/min
Extract recycle rate: 4750 ml/min
Raffinate accumulation rate: 1438 ml/min
Cycle time: 1080 secs

The invention claimed is:

1. A chromatographic separation process for recovering a polyunsaturated fatty acid (PUFA) product from a feed mixture which is a fish oil or which is derived from fish oil, which process comprises the steps of:
   (i) purifying the feed mixture in a chromatographic first separation step, to obtain a first intermediate product; and
   (ii) purifying the first intermediate product obtained in (i) in a simulated or actual moving bed chromatographic second separation step, to obtain a second intermediate product; and
   (iii) purifying the second intermediate product obtained in (ii) in a chromatographic third separation step using a different chromatographic apparatus to that used in the second separation step, to obtain the PUFA product; wherein
   an aqueous organic solvent is used as eluent in each separation step; saturated and/or monounsaturated fatty acids present in the feed mixture are removed in the first separation step;
   the PUFA product is separated from different components of the feed mixture in steps (ii) and (iii); and
   the PUFA product obtained in the third separation step contains EPA or an EPA derivative in an amount greater than 90 wt %.

2. The process according to claim 1, wherein steps (i), (ii) and (iii) are carried out on separate chromatographic apparatuses.

3. The process according to claim 1, wherein the first intermediate product is recovered between the first and second separation steps.

4. The process according to claim 1, wherein the second intermediate product is recovered between the second and third separation steps.

5. The process according to claim 1, wherein the aqueous organic solvent eluent is partly or totally removed from the intermediate product obtained in the first and/or second separation step before the intermediate product is purified further in the next separation step.

6. The process according to claim 1, wherein the eluent is not shared between the separate chromatographic apparatuses.

7. The process according to claim 1, wherein the first intermediate product obtained in the first separation step is enriched in the PUFA product compared to the feed mixture; and the second intermediate product obtained in the second separation step is enriched in the PUFA product compared to the first intermediate product; and/or wherein in the first step the PUFA product is separated from components of the feed mixture which are less polar than the PUFA product, in the second step the PUFA product is separated from components of the feed mixture which are less polar than the PUFA product but more polar than the components separated in the first separation step, and in the third separation step the PUFA product is separated from more polar components of the feed mixture.

8. The process according to claim 1, wherein components separated from the PUFA product in the second separation step comprise DHA or a DHA derivative and/or other PUFAs or PUFA derivatives which are less polar than the PUFA product; and/or components separated from the PUFA product in the third separation step comprise SDA or an SDA derivative and/or other PUFAs which are more polar than the PUFA product.

9. The process according to claim 1, wherein the eluent is a mixture of water and an alcohol, an ether, an ester, a ketone or a nitrile.

10. The process according to claim 9, wherein the eluent is a mixture of water and methanol.

11. The process according to claim 1, wherein the PUFA product contains EPA or an EPA derivative in an amount greater than 95 wt %, preferably 97 wt %.

12. The process according to claim 1, wherein the EPA derivative is EPA ethyl ester (EE).

13. The process according to claim 1, wherein a water:organic solvent ratio used in each separation step is adjusted such that saturated and/or monounsaturated fatty acids present in the feed mixture are removed in the first separation step; and the PUFA product is separated from different components of the feed mixture in steps (ii) and (iii).

14. The process according to claim 1, wherein the aqueous organic solvent eluent used in the second and third separation steps has the same water:organic solvent ratio, and the aqueous organic solvent eluent used in the first separation step has a different water:organic solvent ratio from the organic solvent eluent used in the second and third separation steps,
   wherein the water: organic solvent ratio of the aqueous organic solvent eluent used in the first separation step is preferably lower than the water:organic solvent ratio of the aqueous organic solvent eluent used in the second and third separation steps, and
   wherein the water:organic solvent ratio of the eluent used in the first separation step is more preferably from 0.1:99.9 to 1:99 wt %, and the water:organic solvent ratio of the eluent used in the second and third separation steps is more preferably from 7:93 to 9:91 wt %.

15. The process according to claim 1, wherein part of an extract or raffinate from the first, second or third step is recycled back into the apparatus.

16. A computer program for controlling a chromatography apparatus as defined in claim 1, which computer program contains code means that, when executed, instructs the apparatus to carry out a process according to claim 1.

* * * * *